(12) United States Patent
Hoemann et al.

(10) Patent No.: US 7,705,502 B2
(45) Date of Patent: Apr. 27, 2010

(54) INTERIOR MAGNET MACHINE WITH NON-PERPENDICULAR SLOTS

(75) Inventors: Keith I. Hoemann, Fenton, MO (US); Todd A. Walls, Rock Hill, MO (US)

(73) Assignee: Emerson Electric Co., St. Louis, MO (US)

( * ) Notice: Subject to any disclaimer, the term of this patent is extended or adjusted under 35 U.S.C. 154(b) by 924 days.

(21) Appl. No.: 11/279,872

(22) Filed: Apr. 14, 2006

(65) Prior Publication Data

US 2007/0252467 A1 Nov. 1, 2007

(51) Int. Cl.
*H02K 1/27* (2006.01)
*H02K 1/12* (2006.01)

(52) U.S. Cl. .............. 310/156.53; 310/156.56; 310/156.55

(58) Field of Classification Search ............ 310/156.01, 310/156.02, 156.03, 156.38, 156.39, 156.45, 310/156.53, 156.56, 156.57
See application file for complete search history.

(56) References Cited

U.S. PATENT DOCUMENTS

| 4,139,790 | A | * | 2/1979 | Steen ............... 310/156.83 |
| 5,672,926 | A | * | 9/1997 | Brandes et al. ......... 310/181 |
| 6,441,524 | B2 | * | 8/2002 | Kaneko et al. ...... 310/156.45 |
| 7,230,359 | B2 | * | 6/2007 | Iles-Klumpner ..... 310/156.53 |
| 2005/0040723 | A1 | * | 2/2005 | Asai et al. ......... 310/156.53 |

FOREIGN PATENT DOCUMENTS

| JP | 3631583 B2 | 10/1998 | |
| JP | 11046464 | 2/1999 | |
| JP | 2005027422 | * 1/2005 | ........ 310/156.36 |

* cited by examiner

*Primary Examiner*—Quyen Leung
*Assistant Examiner*—Leda Pham
(74) *Attorney, Agent, or Firm*—Senniger Powers LLP

(57) ABSTRACT

An interior permanent magnet machine having angled slots.

20 Claims, 44 Drawing Sheets

INTERIOR MAGNET MACHINE WITH NON-PERPENDICULAR SLOTS

FIELD OF THE INVENTION

The present invention generally relates to machines with permanent magnets buried in the rotor core and, in particular, slotted rotors for interior magnet machines operating at variable frequencies under an electronic control or operating at a fixed frequency.

BACKGROUND OF THE INVENTION

Interior magnet machines have the following characteristics.

First, many interior magnet machines have lower power density than surface mounted magnet machines. The surface area of the magnet is usually reduced when buried, requiring a larger motor or generator to obtain the same output power. The larger size motor or generator can cause packaging or performance problems in the final application.

Second, a trapezoidal air-gap flux distribution is usually generated by a interior magnet rotor. In applications where the winding currents are sinusoidal, the trapezoidal flux distribution results in significant torque ripple. The torque ripple contributes to noise and vibration in the final application. This can be minimized by selection of the correct slot and pole number, but this solution is not always practical.

Third, the abrupt transitions in the rotor flux distribution contribute to cogging torque. Techniques typically used to reduce cogging torque, such as skewing, result in lower power density.

Fourth, interior magnet machines have higher average inductance than surface magnet machines. The higher inductance reduces the power factor of the machine during operation, increasing the complex power (VA) required from the drive to produce a given output torque. Increasing the drive volt-ampere requirement can increase the drive cost if larger power devices must be used.

The output torque of an interior permanent magnet machine is proportional to the back-emf and winding current when the two are in phase. The winding current in a fixed bus voltage system is limited by the back-emf and machine resistance and inductance. A rotor geometry that results in higher back-emf or lower inductance allows the number of turns to be adjusted to obtain minimum current draw. The decrease in current may allow for the use of smaller power devices, reducing system cost.

Prior art solutions for interior magnet machines with power density greater than or equal to surface magnet machines include "V" magnet and spoke magnet designs. The designs can be difficult to magnetize and tend to have high cogging torque.

Prior art solutions for reducing the impact of a trapezoidal rotor flux distribution include machines with distributed windings. Stators with distributed windings tend to be larger than single tooth windings due to the end coils, and may not fit in the package required by some applications. Single tooth windings in which the number of electrical degrees per slot is not equal to 120 or 240 can also be used. The number of practical combinations is limited by the size of the machine.

Prior art solutions for reducing the cogging torque include shaping of the stator and rotor air-gap surfaces and skew. These solutions tend to reduce the power density of the machine.

Prior art solutions for reducing the average inductance of a interior magnet machine include adding slits to the rotor pole cap. These slits are placed perpendicular to the magnet surface in most cases.

SUMMARY OF THE INVENTION

Other objects and features will be in part apparent and in part pointed out hereinafter.

DETAILED DESCRIPTION OF THE INVENTION

In one embodiment, the invention comprises a machine having a stator and a rotor in magnetic coupling engagement with the stator, wherein the rotor has a geometry with angled slots between the magnet surface and the rotor outside diameter. In another embodiment, the invention comprises a rotor geometry with slots added between the magnet surface and the rotor outside diameter. The slots are placed at an angle and in a location that can increase the fundamental component of the rotor flux distribution. The slots may also decrease the cogging torque. A minimum of two slots per magnetic pole are added. Although any even number of slots is illustrated by the embodiments herein, those skilled in the art will recognize other configurations.

The addition of the slots changes the rotor flux distribution from a trapezoidal shape to a more sinusoidal distribution. The fundamental component of the more sinusoidal distribution can be greater than the fundamental component of the trapezoidal distribution, and the harmonic distortion of the distribution can be reduced. Appendix 1 is a mathematical construction of the invention. The first section shows the uniform (trapezoidal) rotor flux distribution without the slots. The FFT fundamental component of the flux distribution is 1.433 amplitude units. The total harmonic distortion of the distribution is 11.805%. The next section of Appendix 1 present a method for calculating the location of the slots. The method presented increases the fundamental component to 1.616 and reduces the THD to 4.263%.

FIGS. 1-21 show a possible implementation of the slots that match the match the mathematical model above. Appendix 2 and FIGS. 19A and 19B show the rotor flux distribution for the rotor in FIG. 19 with and without the slots, as predicted by finite element analysis. The fundamental component of the flux increases by 5.6% with the slot added. The FEA model also shows a significant reduction in the total harmonic distortion of the flux distribution. Note the mathematical model does not account for leakage around the slot.

Figure 17:
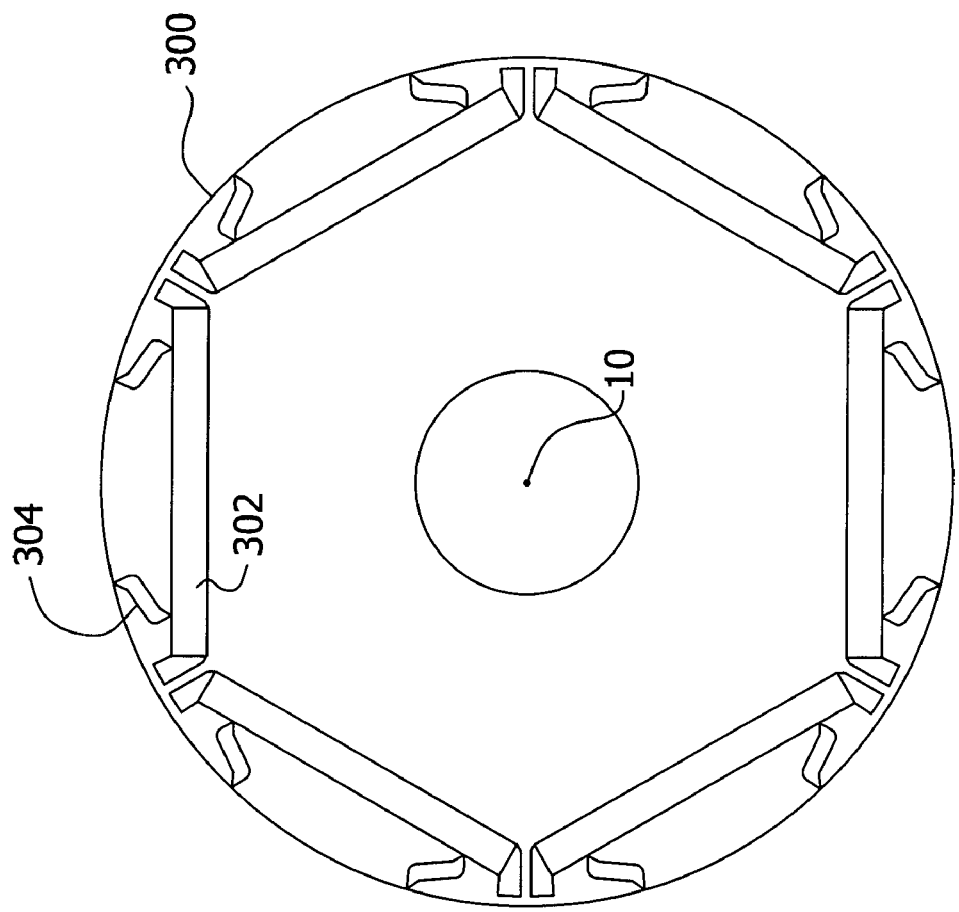
FIGS. 17 and 18 are cross sectional views of embodiments of the invention including six interior magnets, each having two angled slots per magnetic pole.

A comparison of the mathematical model and FEA model can be made using the rotor shown in FIG. 17. This rotor has a reduced leakage path. The FEA model predicts an 11.5% increase in the fundamental flux versus a 12.7% increase predicted by the mathematical model.

The FEA model shows improvement in the shape of the flux distribution, the magnitude of the fundamental component of the flux distribution, average inductance, back-emf fundamental component magnitude, cogging torque magnitude, average torque, and torque ripple.

The location and angle of the slots have not been optimized at this time. Further work is required to optimize these parameters for torque production and cogging torque reduction.

The advantages described above also apply to line start permanent magnet machines. Examples of LSPM rotors are in FIGS. 19 and 20. The angles and locations of the slots may need to be adjusted due to the presence of the cage.

The invention reduces the cogging torque while maintaining or increasing the back-emf and average torque production. This is a highly unusual result. Most methods used for reducing cogging torque also reduce the back-emf and average torque.

The higher back-emf can be taken advantage of in two ways. First, it can be used to increase the power density of the machine, by increasing the torque supplied by a fixed motor or generator size, or by reducing the size of the motor or generator to produce the same torque.

Alternatively, the number of turns could be reduced to keep the same back-emf. The inductance of the machine is proportional to the square of the turns, so a substantial reduction in inductance is possible. A motor or generator using the rotor shown in FIG. 1 with the slots produces 1.9% more torque than a rotor without the slots. Assuming the torque is proportional to the number of turns, reducing the number of turns by 1.9% to produce the same torque with the slots results in a 3.76% decrease in the average inductance.

FIGS. 1-21 illustrate various embodiments of the invention. For convenience, the rotor of the invention is illustrated in cross section as a lamination having slots. In use, the stack of laminations would be fitted with permanent magnets and the slots would be open (i.e., air filled) or filled with a non-magnetic material. For convenience, each lamination is illustrated as including the interior permanent magnets.

Figure 1:
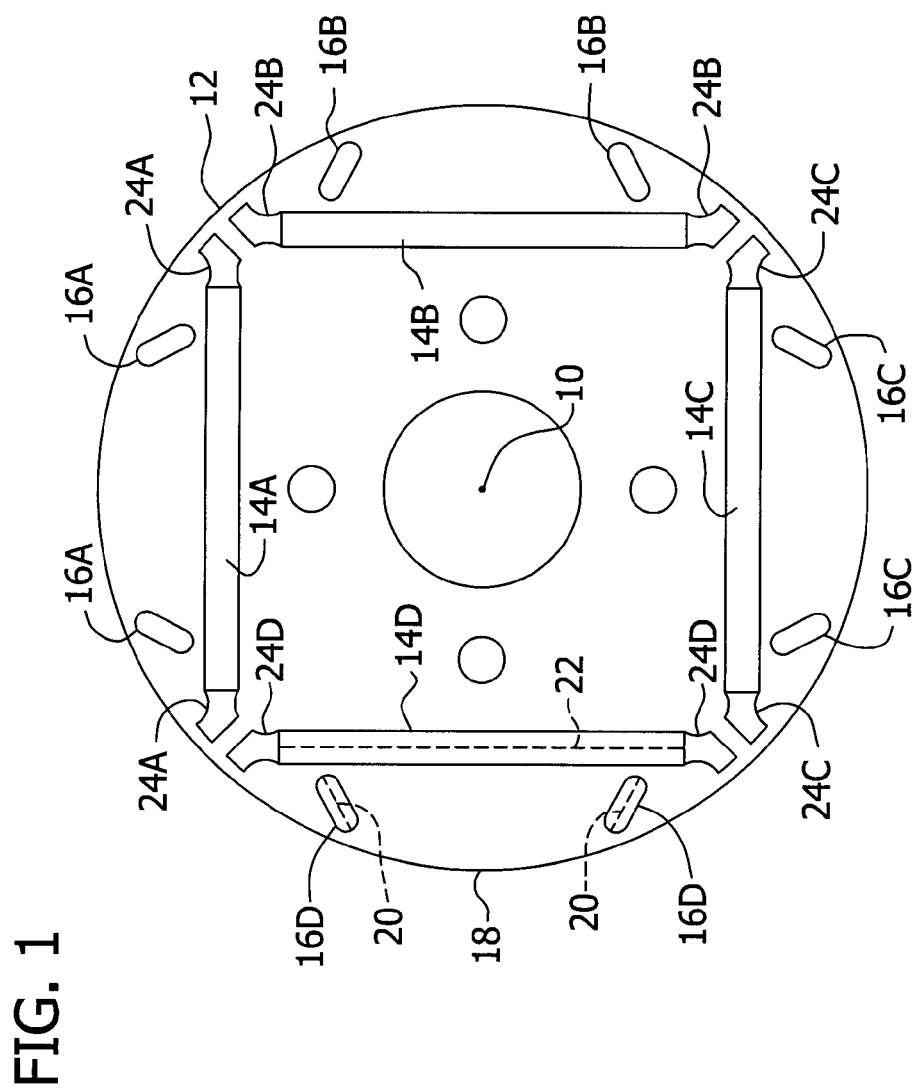
FIGS. 1, 2, 3, 6, 9, 10, 14, 15, and 16 are cross sectional views of embodiments of the invention including four interior magnets, each having two angled slots per magnetic pole.
Figure 1A:
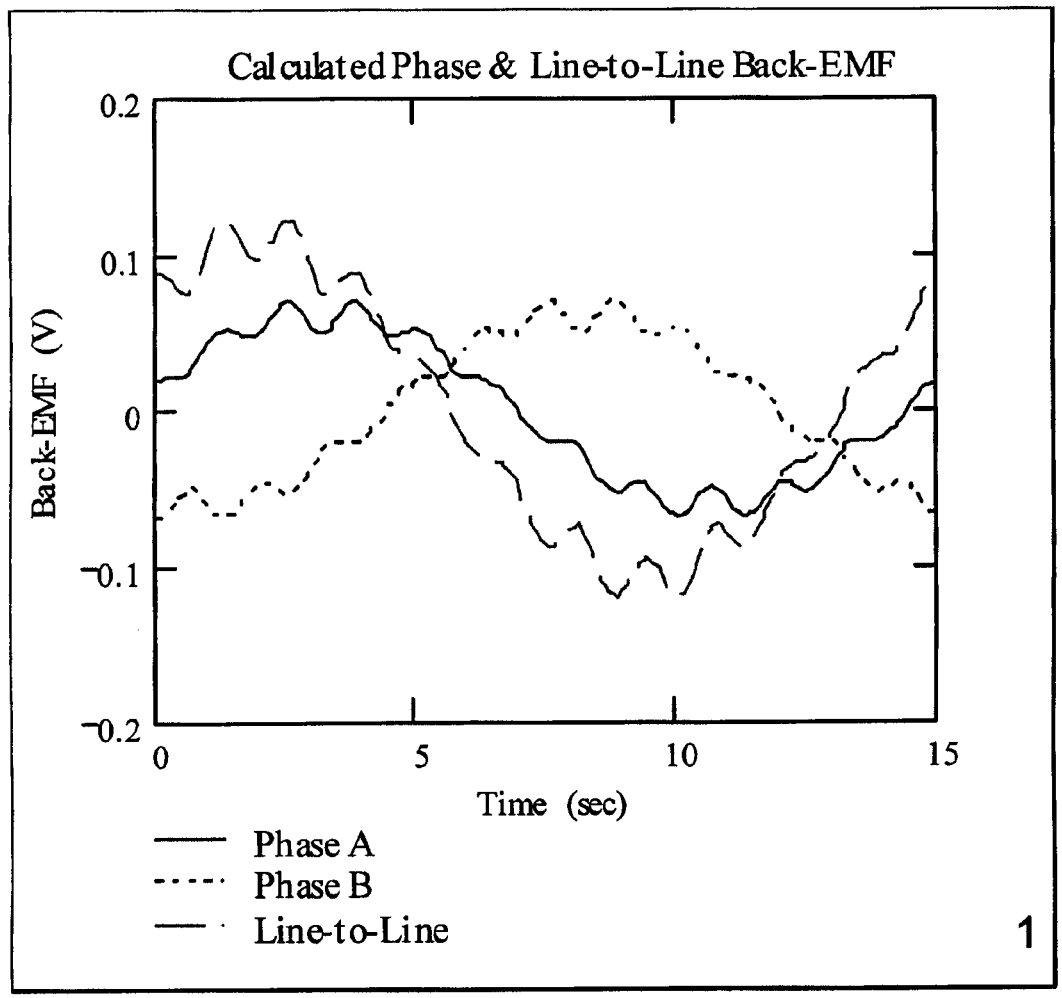
FIG. 1A is a graph illustrating the back emf of a motor or generator including a rotor having laminations as illustrated in FIG. 1 including angled slots 16.
Figure 1B:
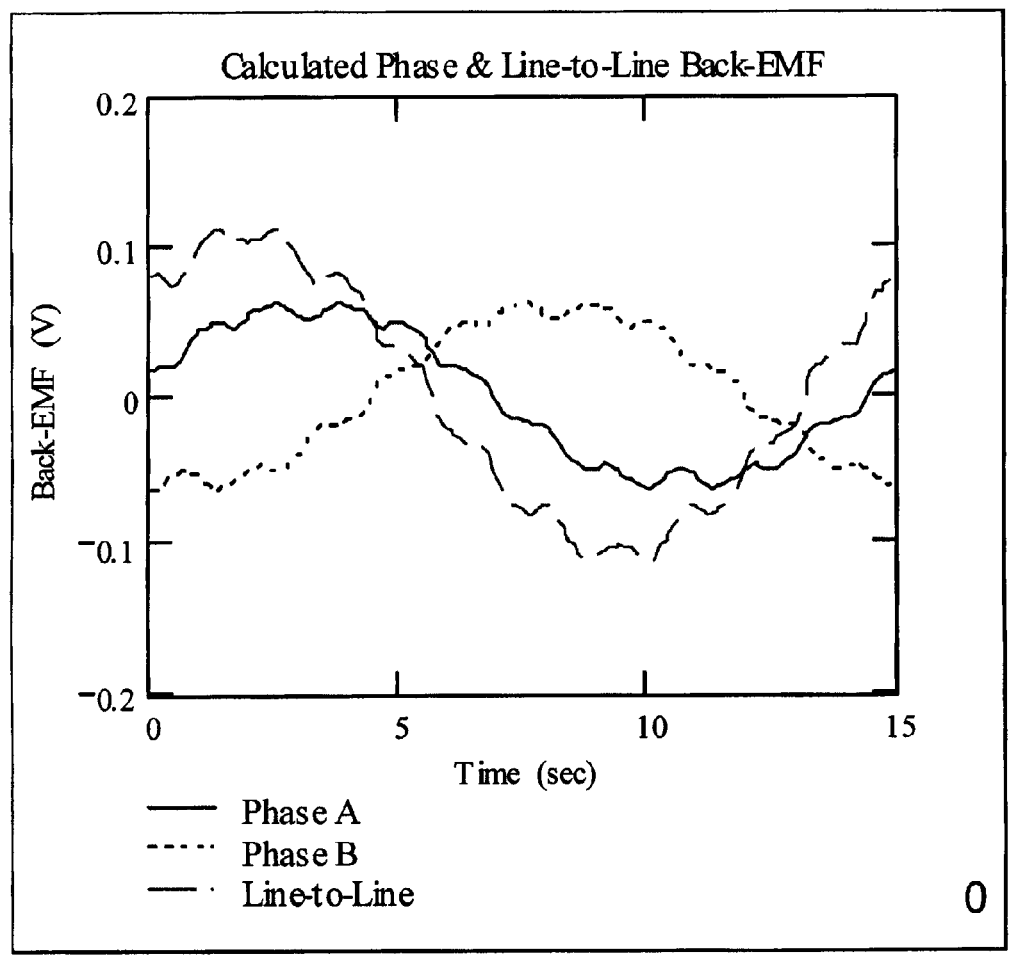
FIG. 1B is a graph illustrating the back emf of a motor or generator including a rotor having laminations as illustrated in FIG. 1 without angled slots 16.

Thus, FIG. 1 is an exemplary illustration of one embodiment of a rotor according to the invention. The rotor includes a cylindrical periphery 18 having a central axis of rotation 10. The cross-section of the rotor, as shown in FIG. 1, is taken perpendicular to the central axis 10 and includes the following. A plurality of buried (e.g., interior) permanent magnets 14 are positioned with slots in the rotor, each magnet 14 having a longitudinal dimension which is greater than a transverse dimension (e.g., rectangular in cross section). A plurality of non-magnetic slots 16 are associated with one of the magnets 14, each slot 16 having a longitudinal dimension which is greater than a transverse dimension, wherein an axis of the longitudinal dimension of the slot is not perpendicular to an axis of the longitudinal dimension of its associated interior magnet. Each slot 24 is positioned generally between the periphery 18 and one of the interior magnets 14 with which the slot 24 is associated. Preferably, there are an even number of at least two slots 24 associated with each magnetic pole. An axis of the longitudinal direction of each magnet 14 is substantially parallel to a tangent of the periphery 18 of the cylindrical housing. In one embodiment, the slots 16 are at an angle not equal to 90 degrees relative to the axis of the longitudinal dimension of its associated interior magnet 14.

FIG. 1 is a cross sectional view taken along a perpendicular to a central axis of rotation 10 of a lamination 12 of a rotor according to one embodiment of the invention. Each interior magnet 14 has two associated slots 16 between the magnet 14 and a periphery 18 of the lamination wherein the longitudinal axis 20 of the slots are at an angle of less than 90 degrees relative to a longitudinal axis 22 of its associated interior magnet 14. In this embodiment, each interior magnet 14 has optional end slots 24. The slots 16 and/or the end slots 24 may be filled with air or other non-magnetic material.

In FIGS. 2-16, various lamination embodiments are illustrated, each having four identical quadrants as shown with regard to quadrants A, B, C and D of FIG. 1. For simplicity, only one quadrant is described and labeled with reference characters.

Figure 2:
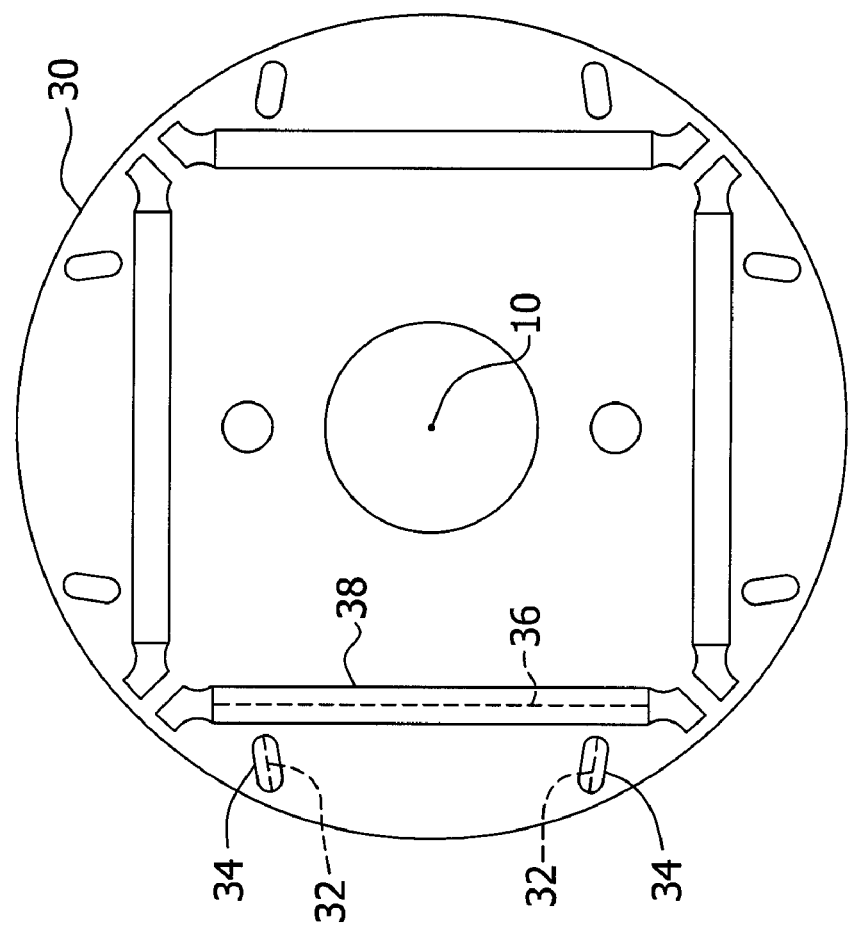
Figure 2A:
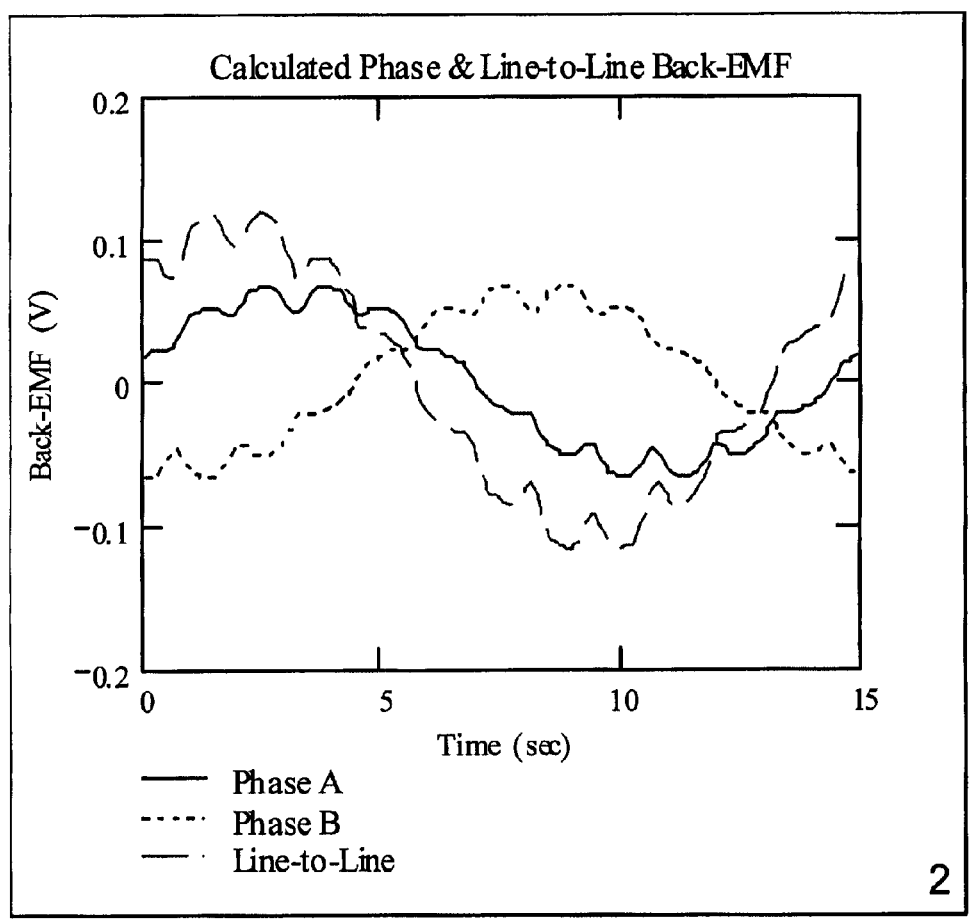
FIGS. 2A, 3A, 6A, 9A, 10A, 14A, and 15A are graphs illustrating the back emf of a motor or generator including a rotor having laminations as illustrated in FIGS. 2, 3, 6, 9, 10, 14, and 15, respectively, each including angled slots.

FIG. 2 is a cross sectional view taken along a perpendicular to the central axis of rotation 10 of a lamination 30 of a rotor according to one embodiment of the invention similar to FIG. 1. In this embodiment, the longitudinal axis 32 of the slots 34 are at a greater angle (but less than 90 degrees) relative to a longitudinal axis 36 of its associated interior magnet 38 as compared to the angle of axis 20 illustrated in FIG. 1. In this embodiment, the slots 32 are shorter in length than the slots 16 of FIG. 1.

Figure 3:
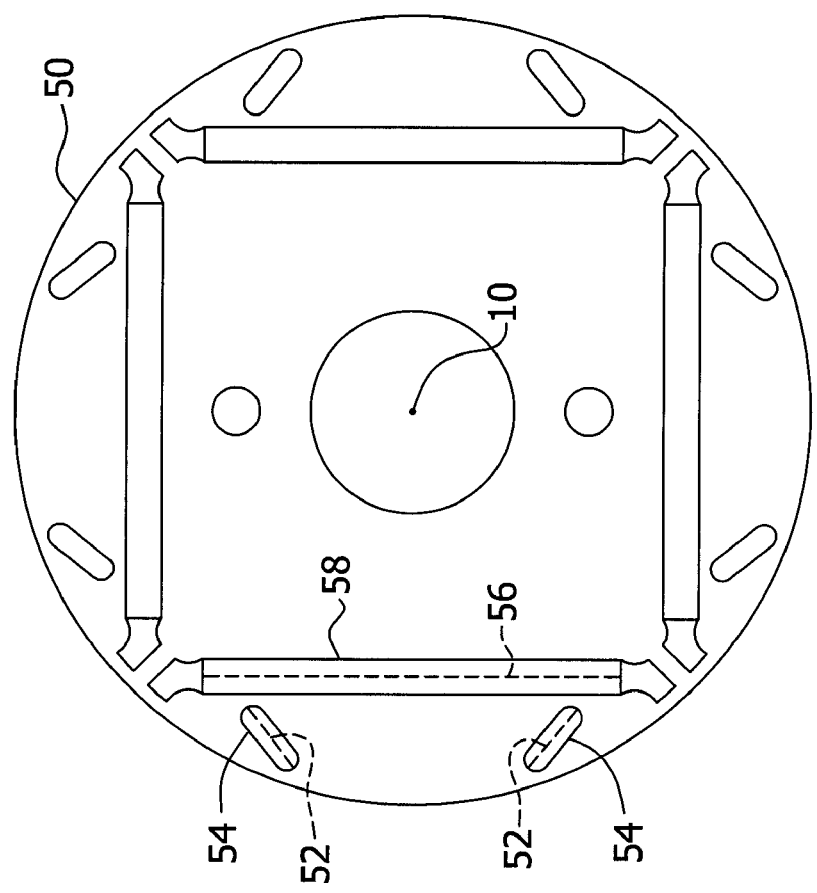
Figure 3A:
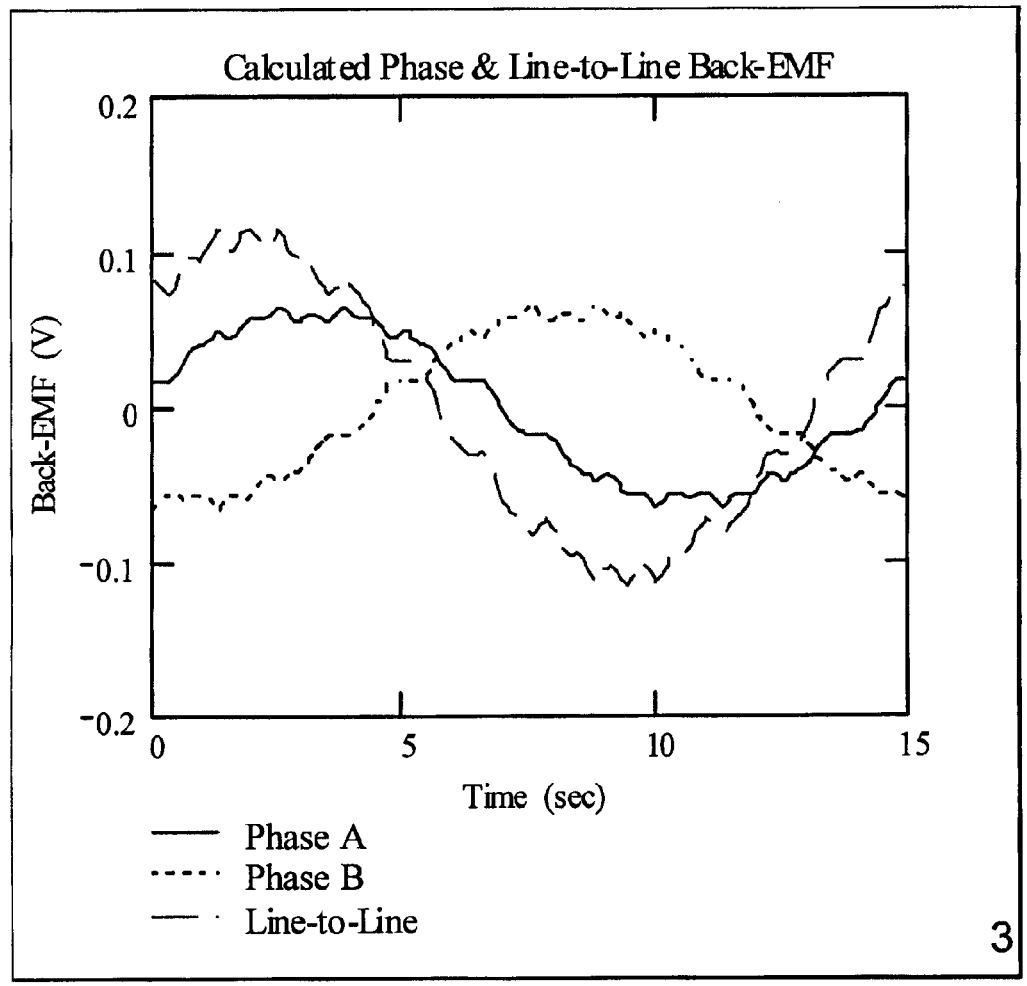

FIG. 3 is a cross sectional view taken along a perpendicular to the axis of rotation 10 of a lamination 50 of a rotor according to one embodiment of the invention similar to FIG. 1. In this embodiment, the longitudinal axis 52 of the slots 54 are at a lesser angle (but greater than 0 degrees and less than 90 degrees) relative to a longitudinal axis 56 of its associated interior magnet 58 as compared to the angle of axis 20 of the slots 16 illustrated in FIG. 1. In this embodiment, the slots 54 are longer in length than the slots 16 of FIG. 1.

Figure 4:
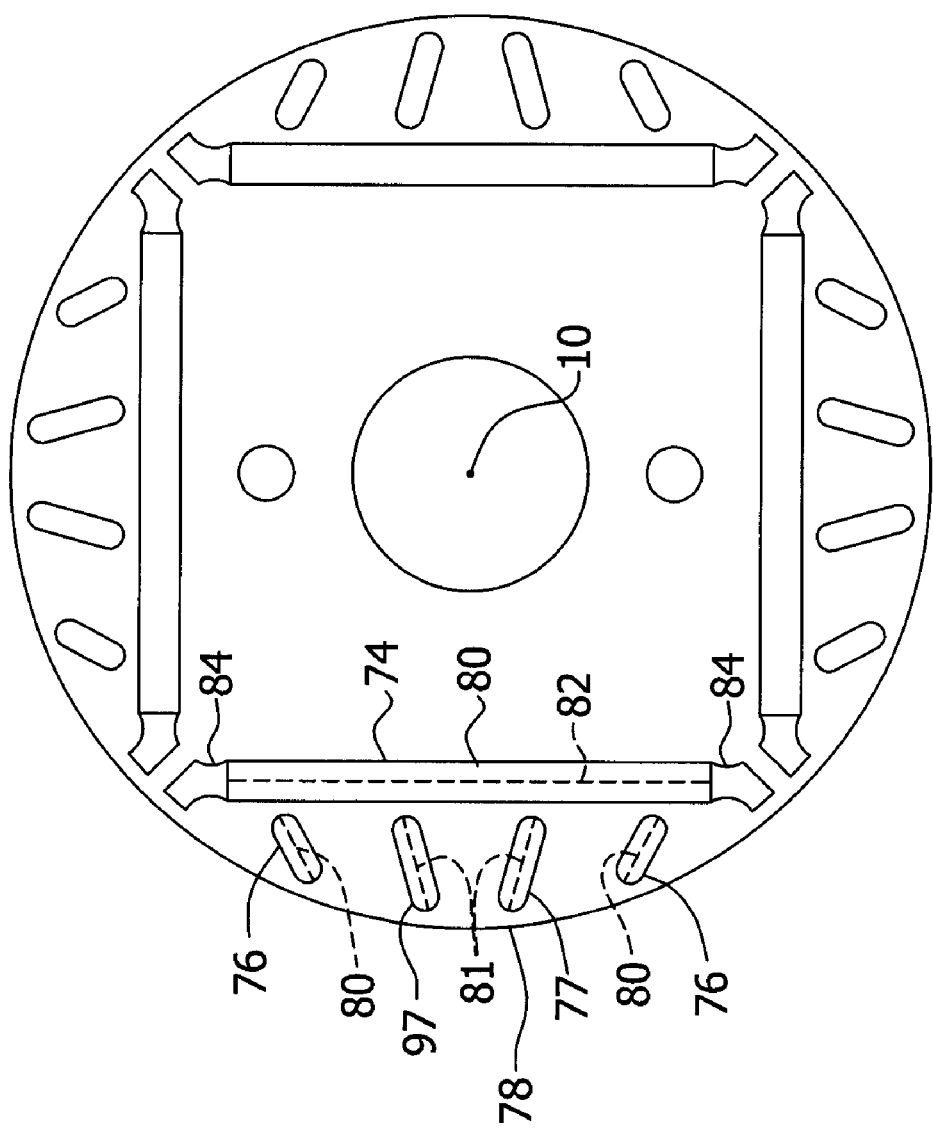
FIGS. 4, 5, 7, 8, 11, 12, and 13 are cross sectional views of embodiments of the invention including four interior magnets, each having four angled slots per magnetic pole.
Figure 4A:
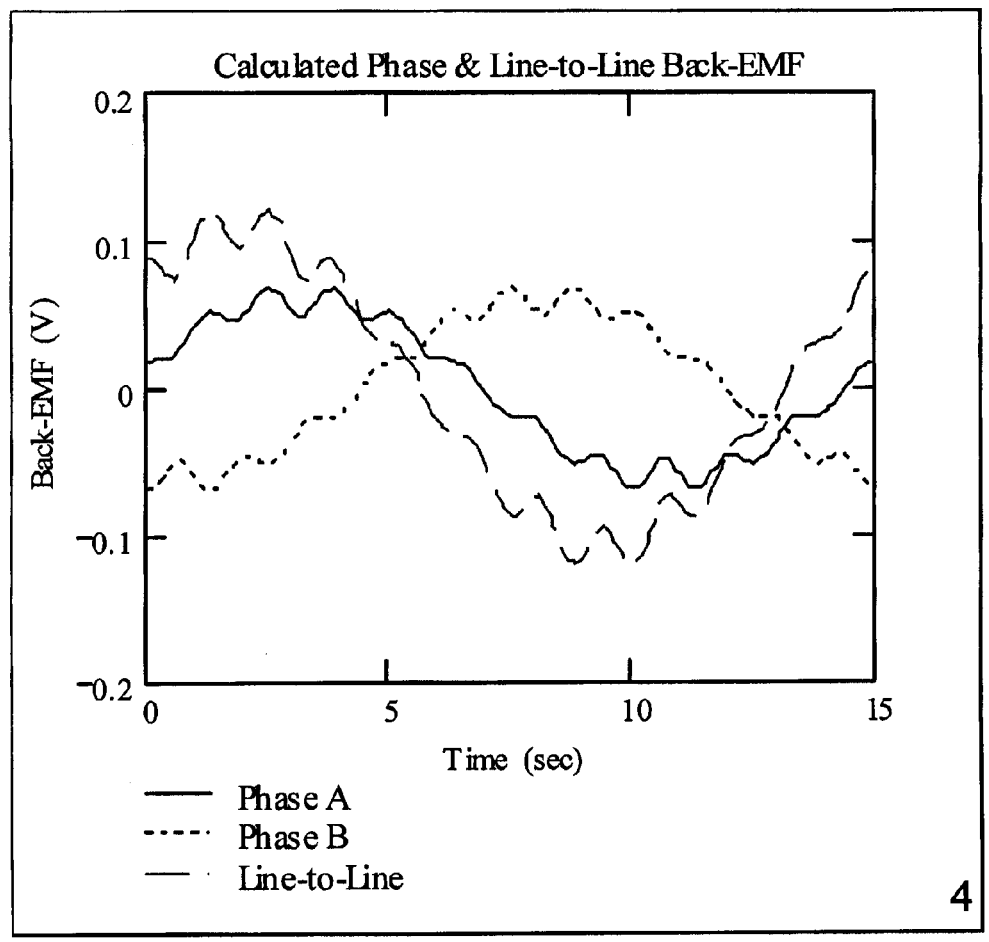
FIGS. 4A, 5A, 7A, 8A, 11A, 12A, and 13A are graphs illustrating the back emf of a motor or generator including a rotor having laminations as illustrated in FIGS. 4, 5, 7, 8, 11, 12, and 13, respectively, each including angled slots.

FIG. 4 is a cross sectional view taken along a perpendicular to the axis of rotation 10 of a lamination 72 of a rotor according to one embodiment of the invention.

Each interior magnet 74 has four associated slots 76 and 77 between the magnet 74 and a periphery 78 of the lamination wherein the longitudinal axis 80 and 81 of the slots are at an angle of less than 90 degrees relative to a longitudinal axis 82 of its associated interior magnet 74. In this embodiment, each interior magnet 74 has optional slotted ends 84 which may be filled with air or other non-magnetic material. In this embodiment, the two outer slots 76 form a smaller angle with the axis 82 than the two inner slots 77 and the two outer slots 76 are shorter in length than the two inner slots 77.

Figure 5:
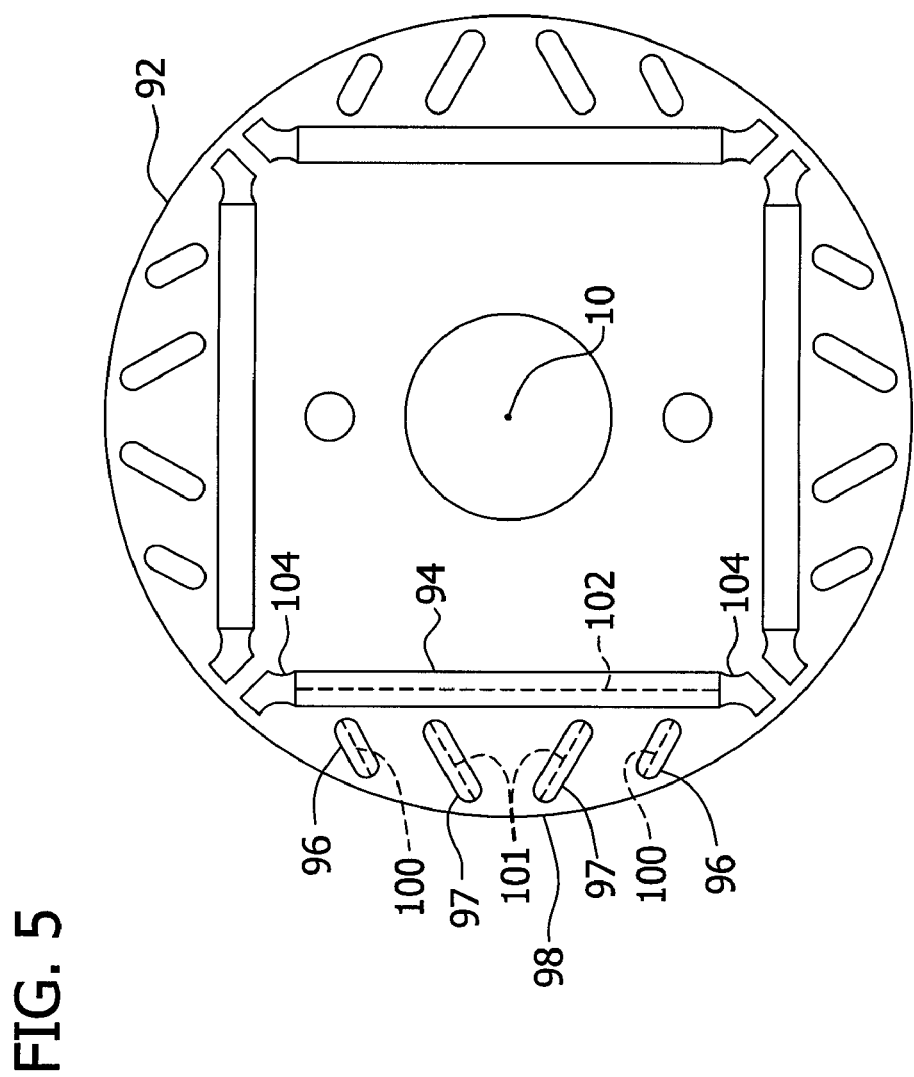
Figure 5A:
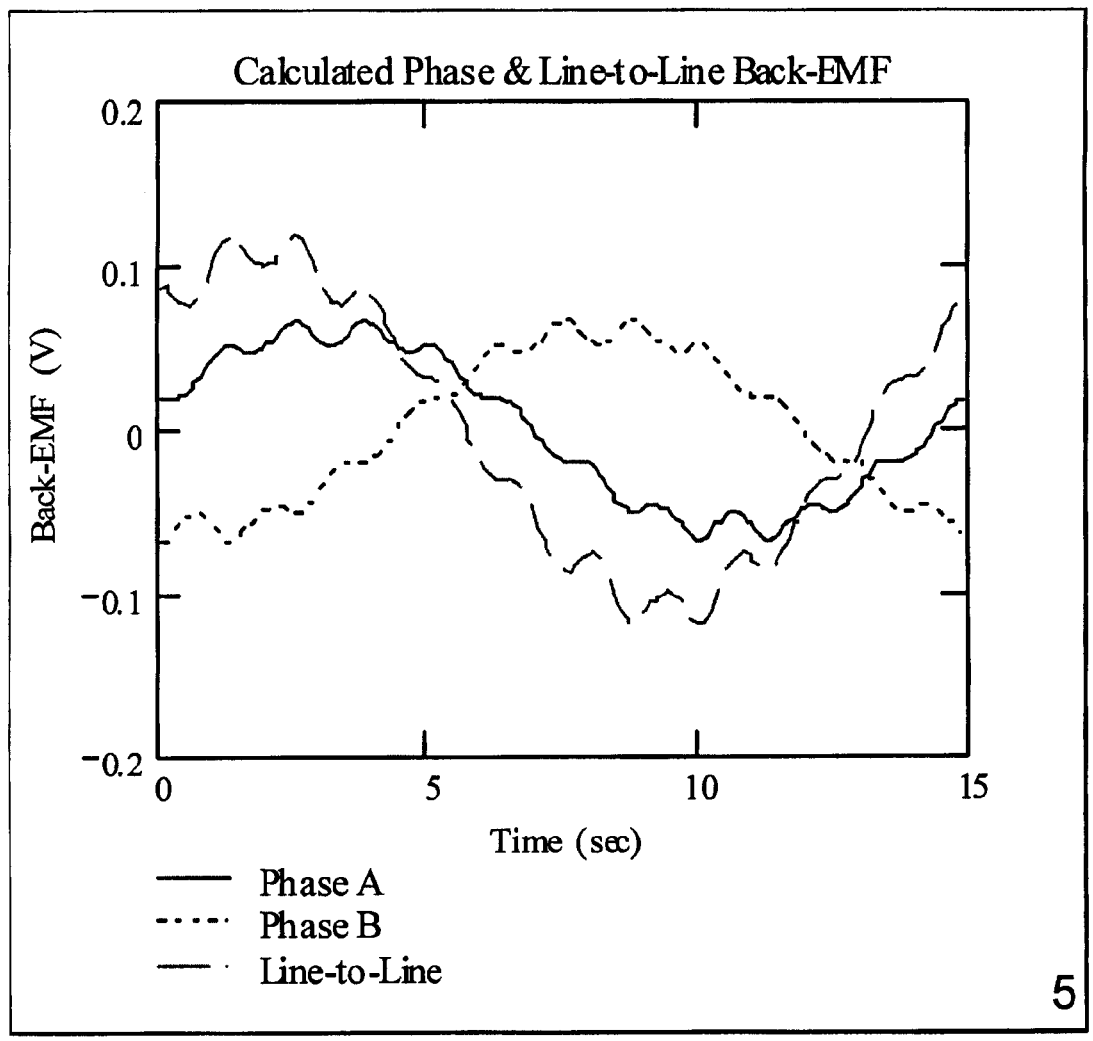

FIG. 5 is a cross sectional view taken along a perpendicular to the axis of rotation 10 of a lamination 92 of a rotor according to one embodiment of the invention. Each interior magnet 94 has four associated slots 96 and 97 between the magnet 94 and a periphery 98 of the lamination wherein the longitudinal axis 100 and 101 of the slots are at an angle of less than 90 degrees relative to a longitudinal axis 102 of its associated interior magnet 94. In this embodiment, each interior magnet 94 has optional slotted ends 104 which may be filled with air or other non-magnetic material. In this embodiment, the two outer slots 96 form the same angle with the axis 102 than the two inner slots 97 and the two outer slots 96 are shorter in length than the two inner slots 97.

Figure 6:
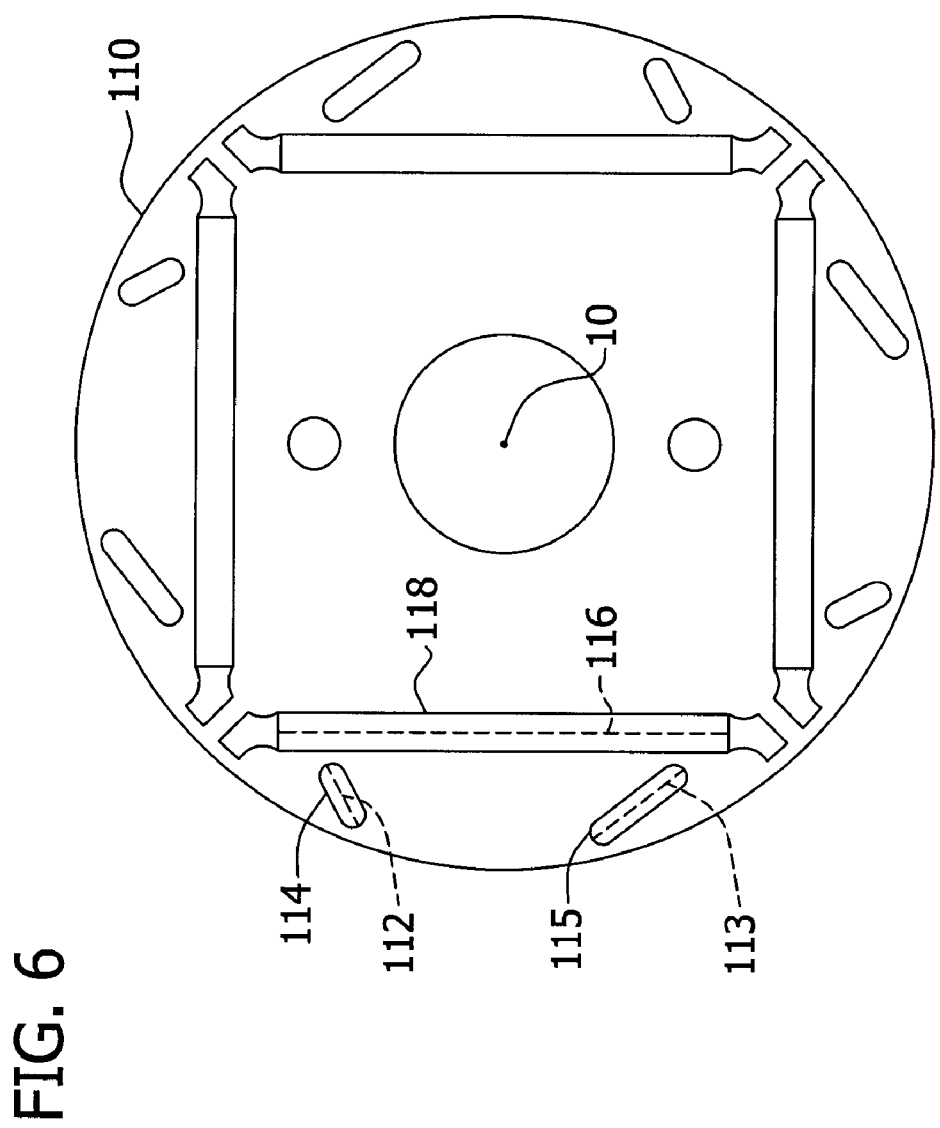
Figure 6A:
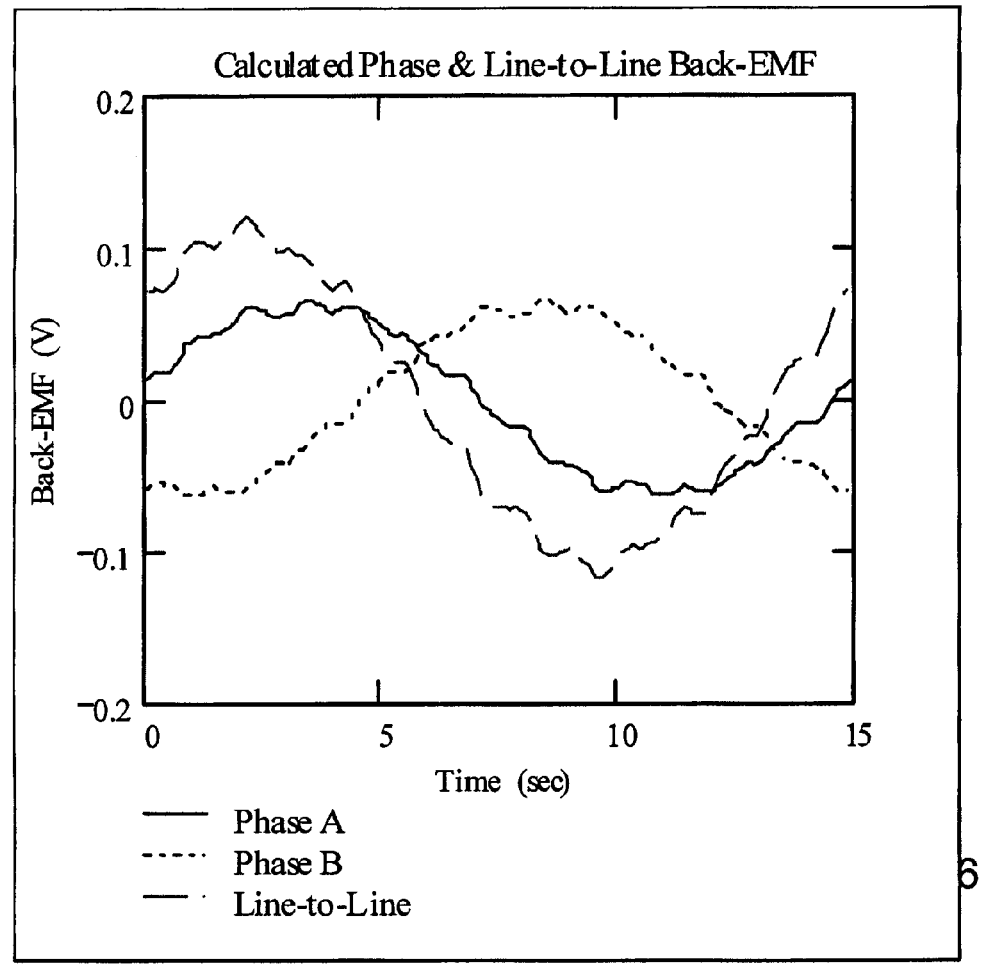

FIG. 6 is a cross sectional view taken along a perpendicular to the axis of rotation 10 of a lamination 110 of a rotor according to one embodiment of the invention similar to FIG. 1. In this embodiment, the longitudinal axis 112 of the slots 114 are at the same angle relative to a longitudinal axis 116 of its associated interior magnet 118 as compared to the angle illustrated of FIG. 1. In this embodiment, the slots 114 are the same length as the slots 16 of FIG. 1. In this embodiment, the longitudinal axis 113 of the slots 115 are at a lesser angle relative to a longitudinal axis 116 of its associated interior magnet 118 as compared to the angle of axis 20 of the slots 16 illustrated in FIG. 1. In this embodiment, the slots 115 are longer in length than the slots 16 of FIG. 1.

Figure 7:
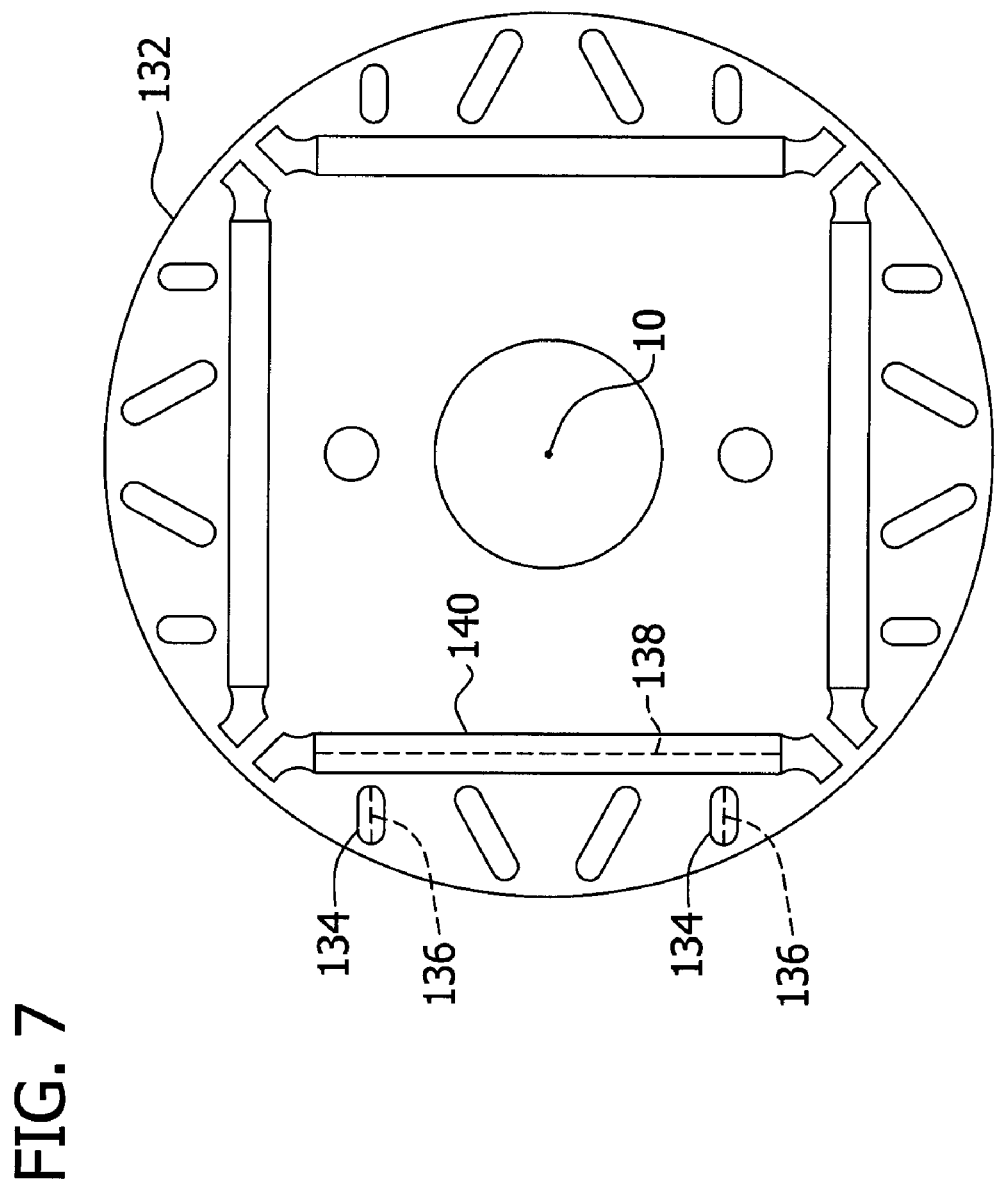
Figure 7A:
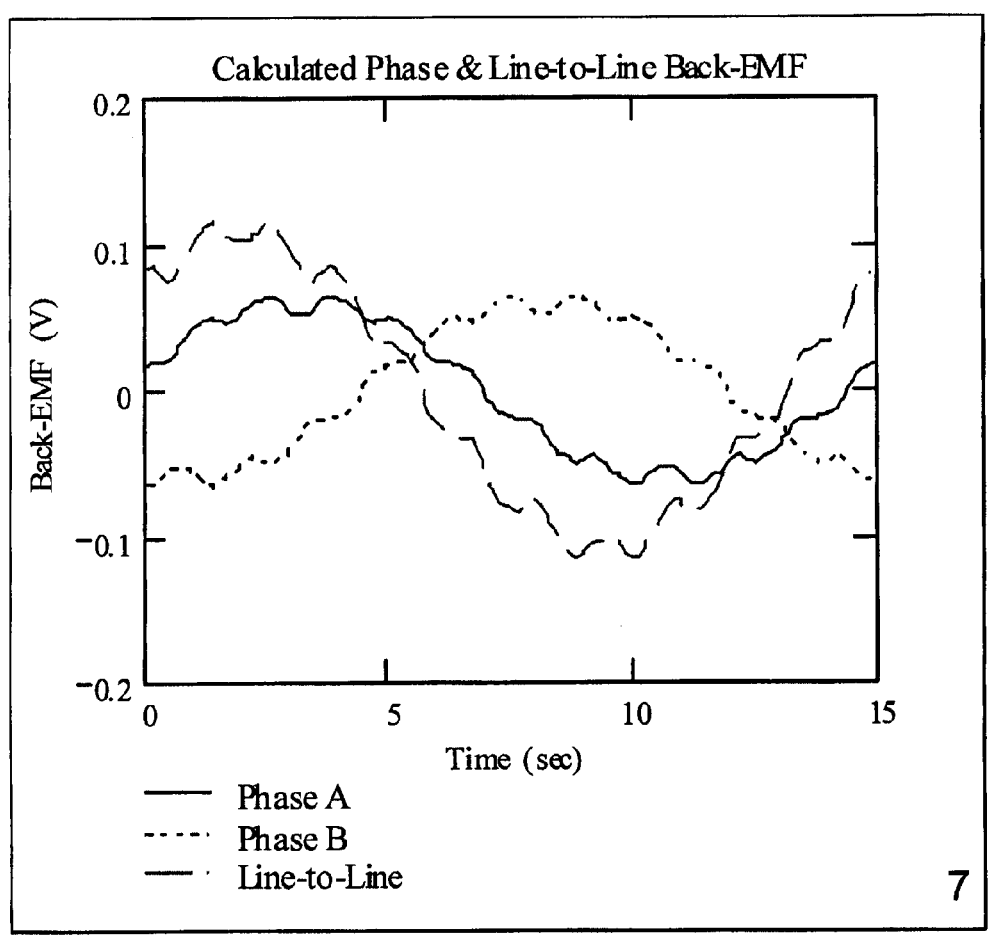

FIG. 7 is a cross sectional view taken along a perpendicular to the axis of rotation 10 of a lamination 132 of a rotor according to one embodiment of the invention. This embodiment is the same as FIG. 5 except that slots 134 have a longitudinal axis 136 which is perpendicular relative to a longitudinal axis 138 of its associated interior magnet 140.

Figure 8:
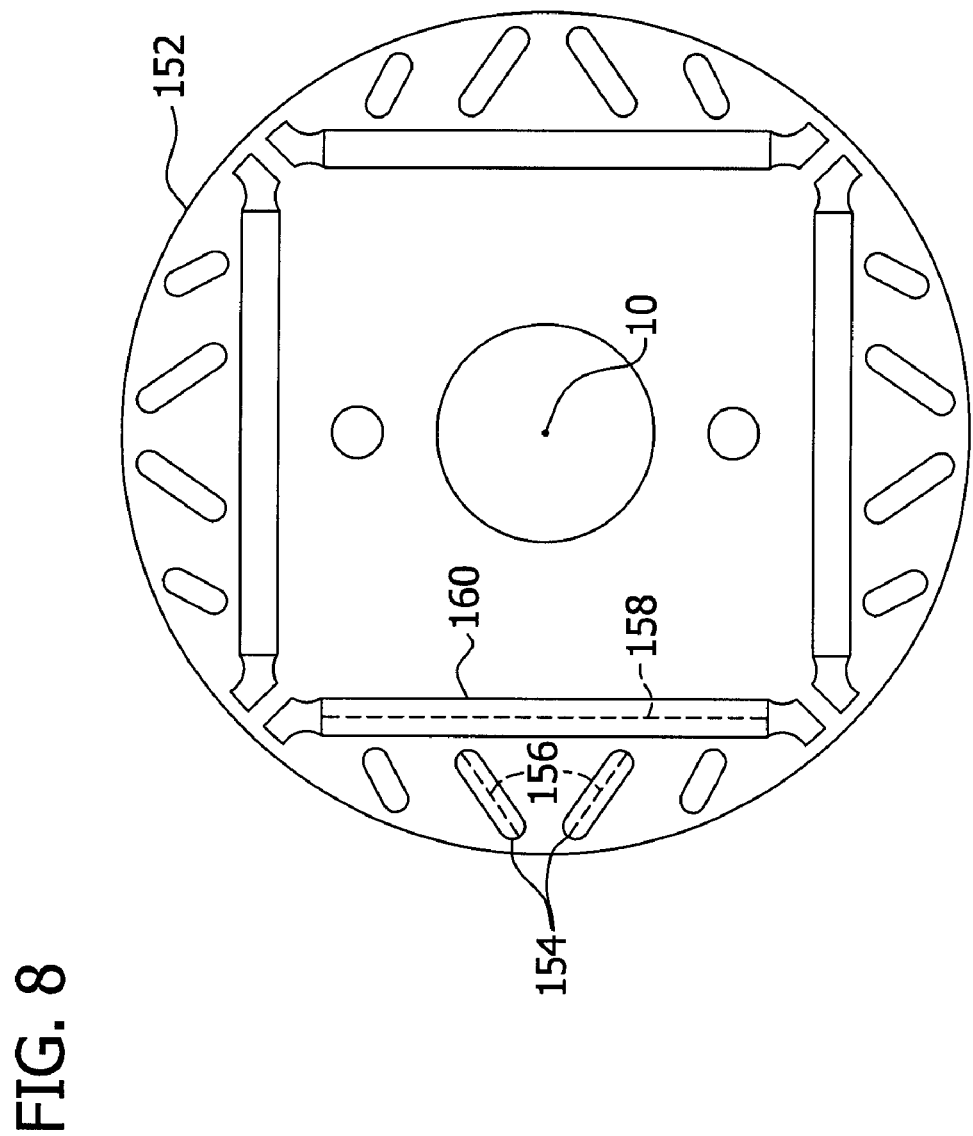
Figure 8A:
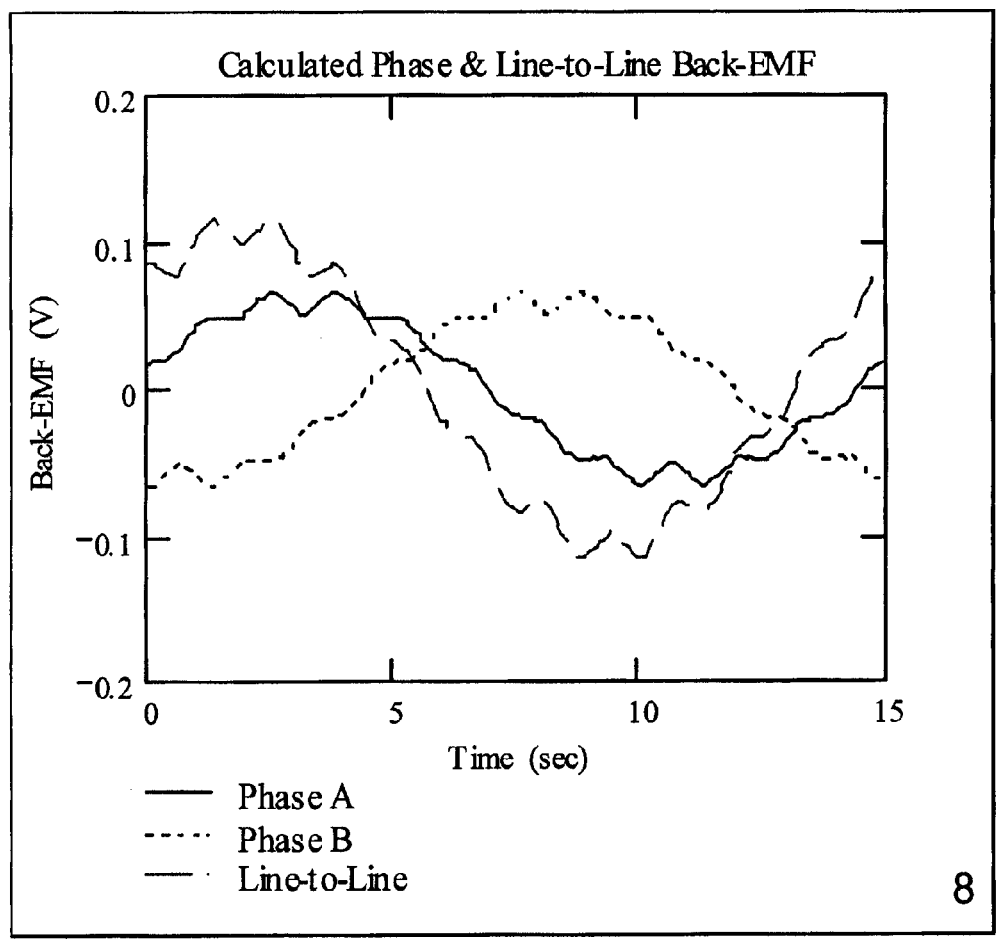

FIG. 8 is a cross sectional view taken along a perpendicular to the axis of rotation 10 of a lamination 152 of a rotor according to one embodiment of the invention. This embodiment is the same as FIG. 5 except that slots 154 have a longitudinal axis 156 which is at a lesser angle relative to a longitudinal axis 158 of its associated interior magnet 160 as compared to the angle of axis 101 of slots 97 of FIG. 5.

Figure 9:
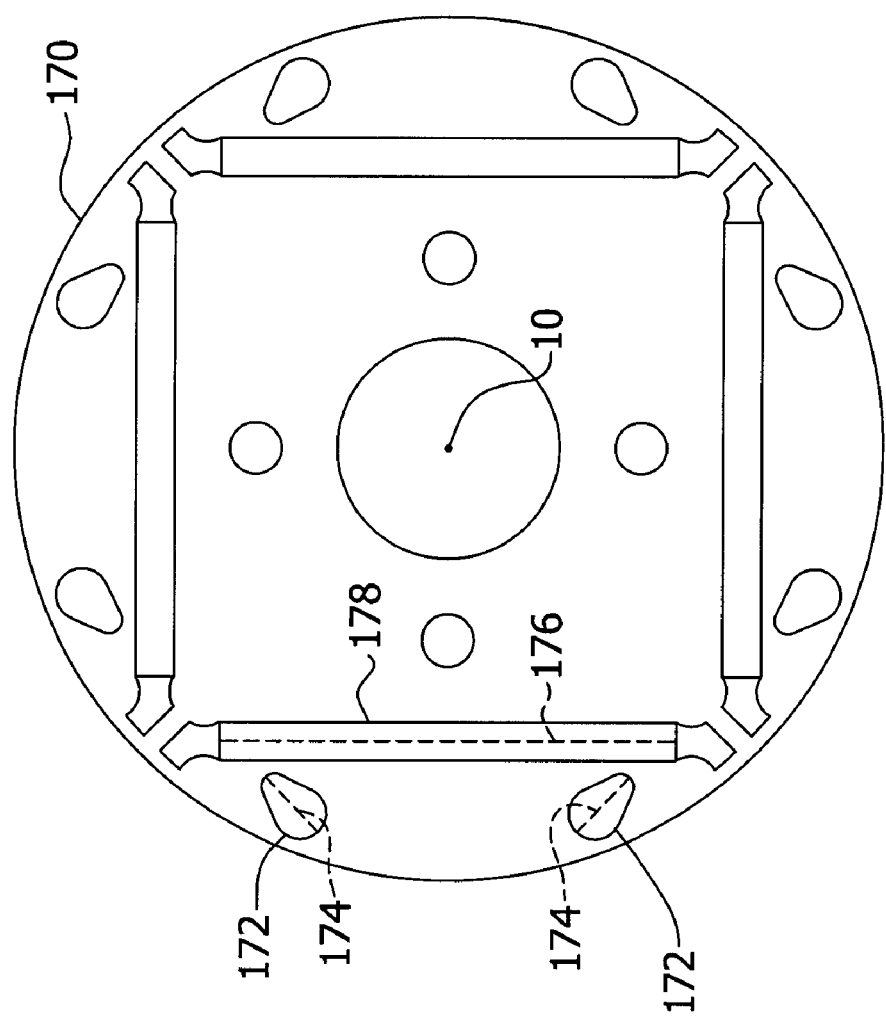
Figure 9A:
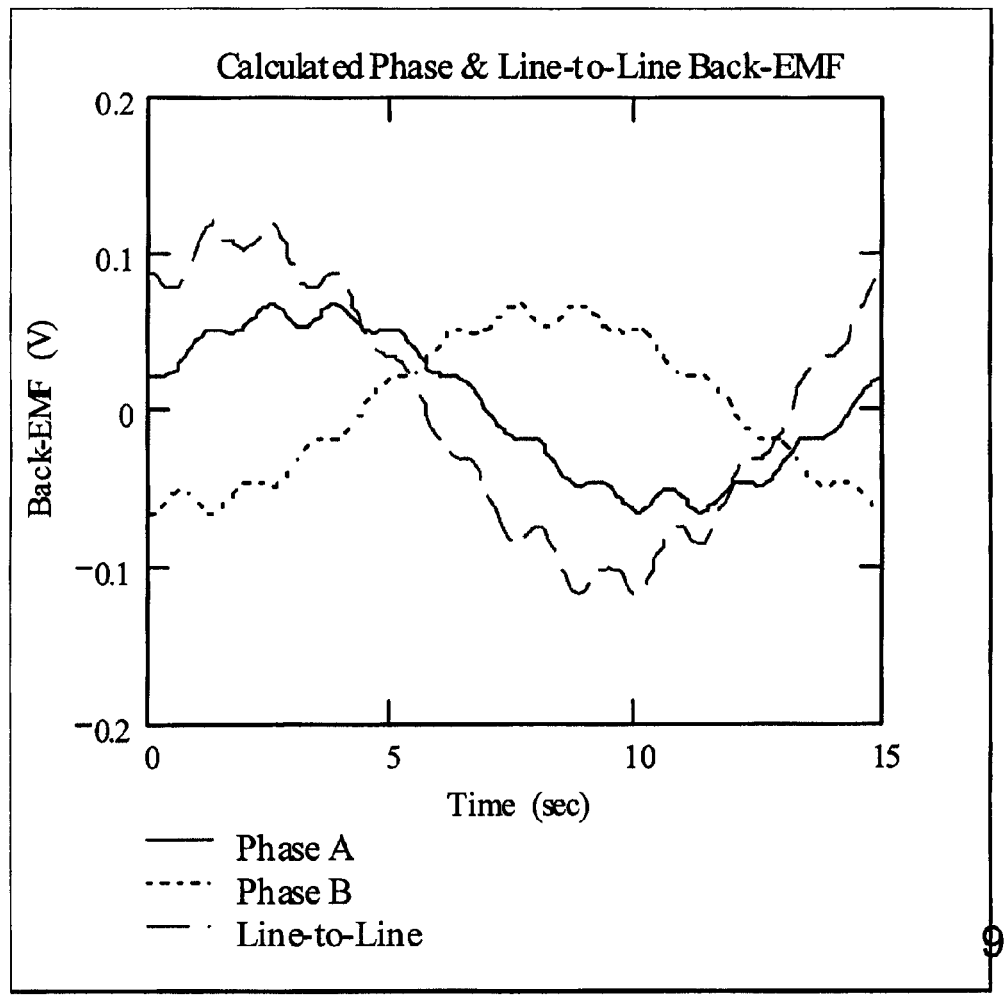
Figure 9B:
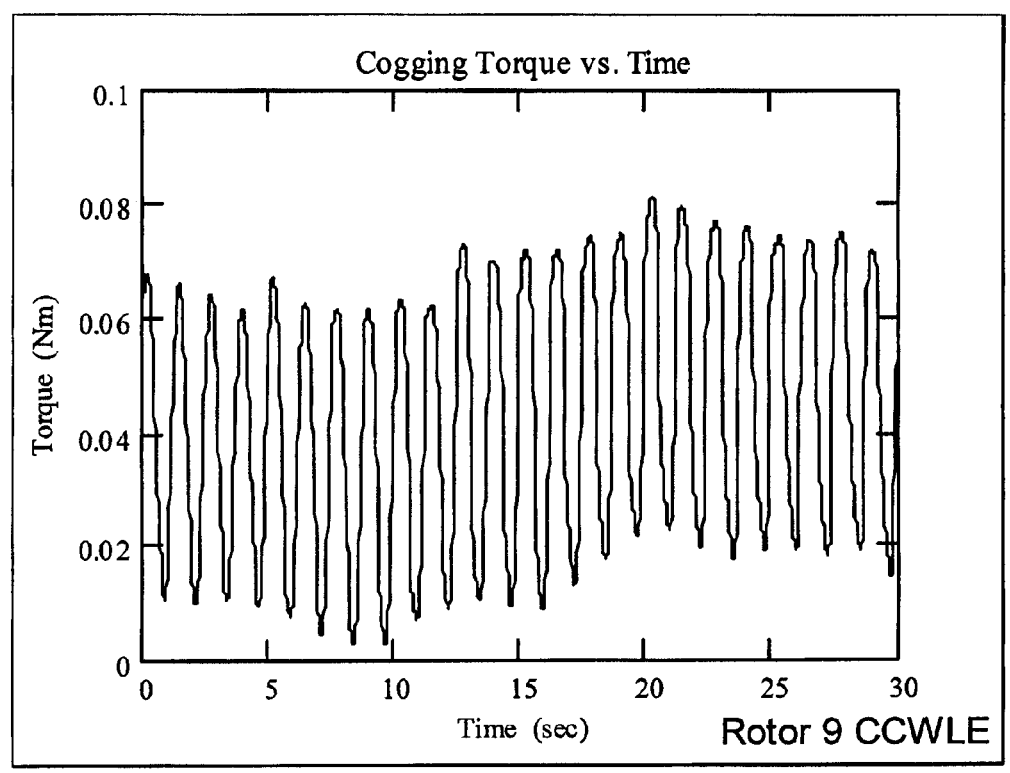
FIG. 9B is a graph illustrating the cogging torque of a motor or generator including a rotor having laminations as illustrated in FIG. 9 including angled slots 172.

FIG. 9 is a cross sectional view taken along a perpendicular to the axis of rotation 10 of a lamination 170 of a rotor according to one embodiment of the invention. This embodiment is the same as FIG. 1 except that slots 172 are tear-shaped having one end which is wider than the other end as compared to the slots 16 of FIG. 1. In addition, the slots 172 have a longitudinal axis 174 which is at a lesser angle relative to a longitudinal axis 176 of its associated interior magnet 178 as compared to the angle of axis 20 of the slots 16 of FIG. 1.

Figure 10:
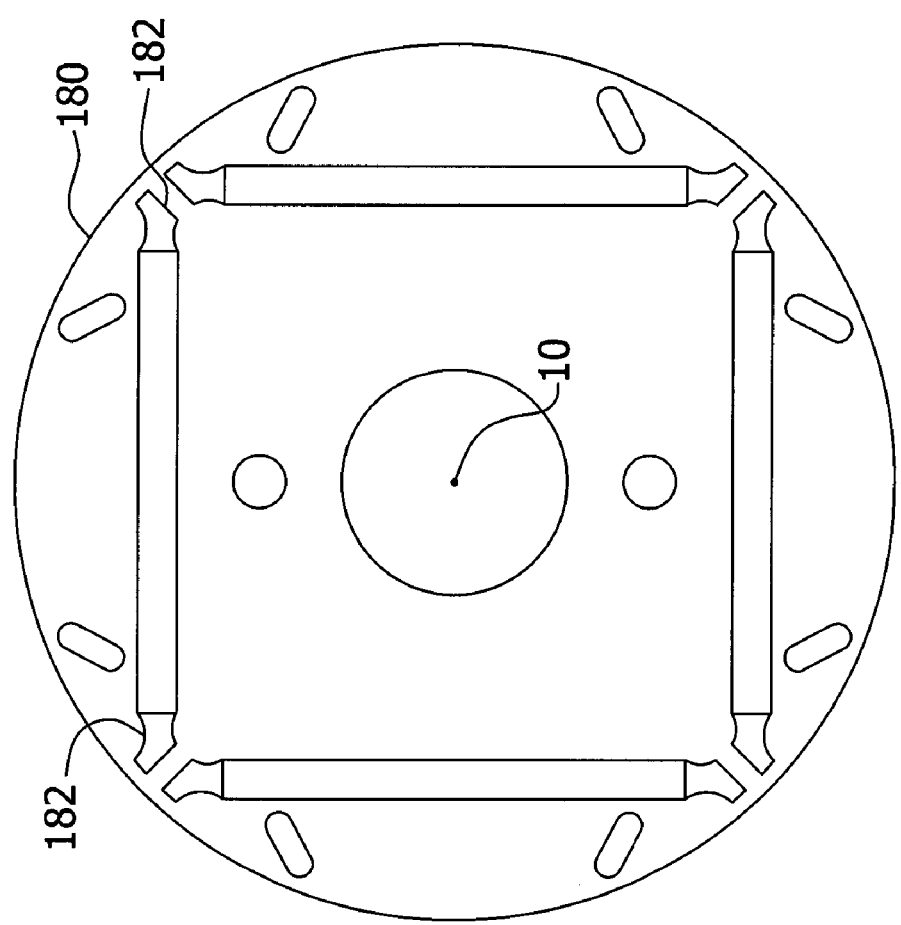
Figure 10A:
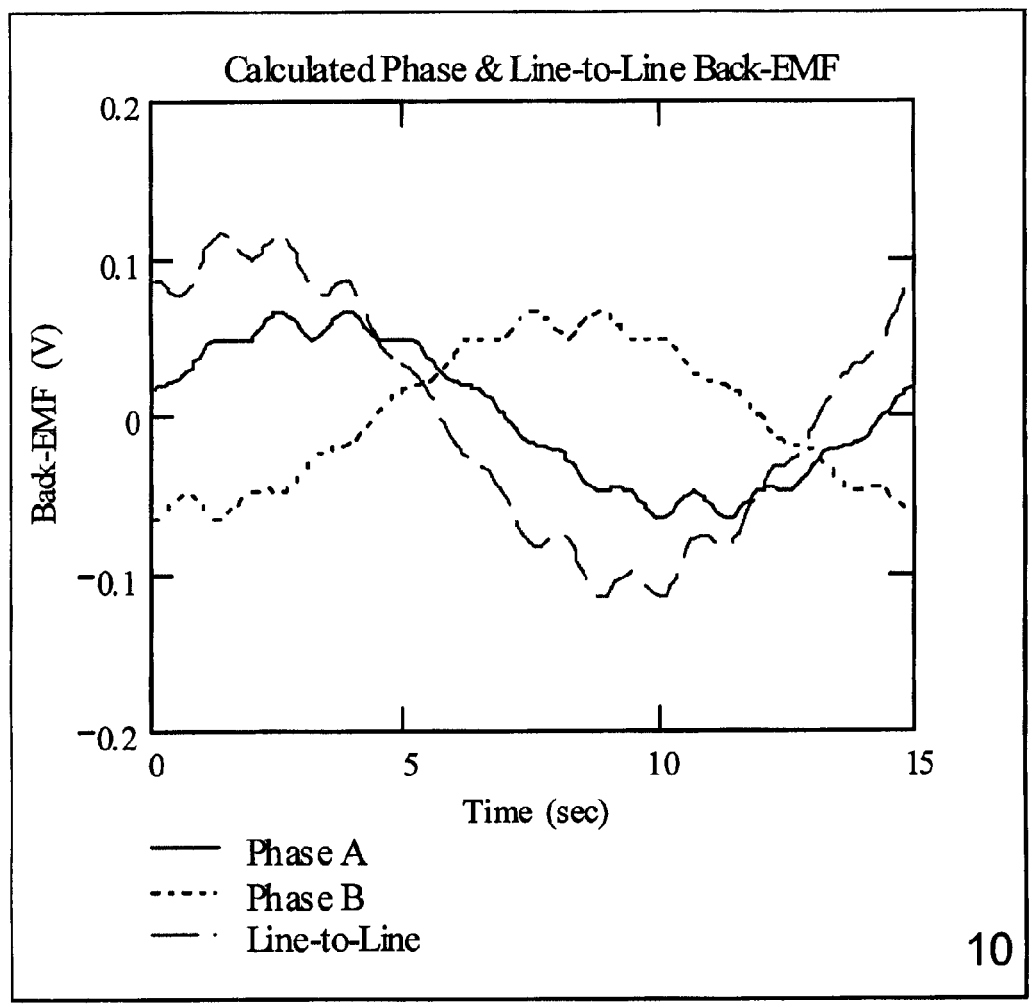

FIG. 10 is a cross sectional view taken along a perpendicular to the axis of rotation 10 of a lamination 180 of a rotor according to one embodiment of the invention. This embodiment is the same as FIG. 1 except that end slots 182 are narrower in width than the end slots 24 of FIG. 1.

Figure 11:
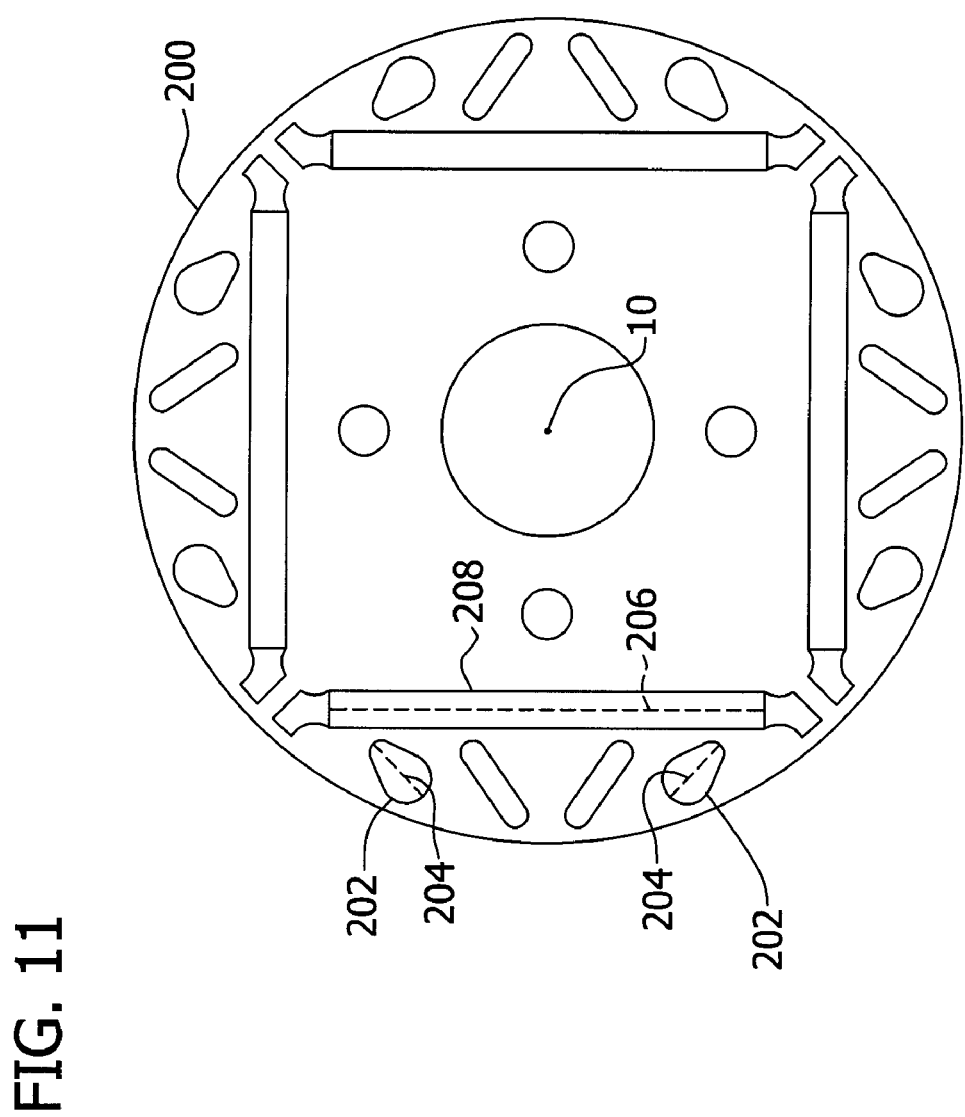
Figure 11A:
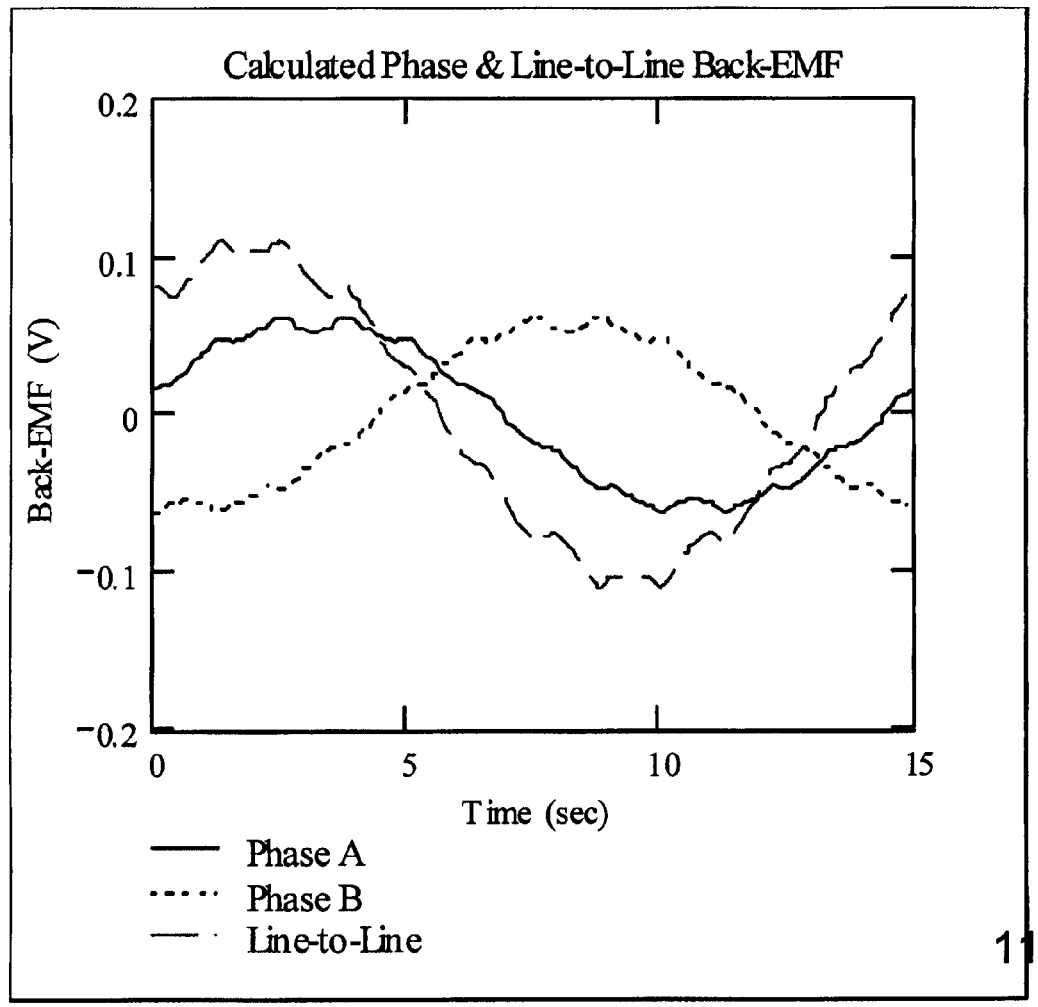
Figure 11B:
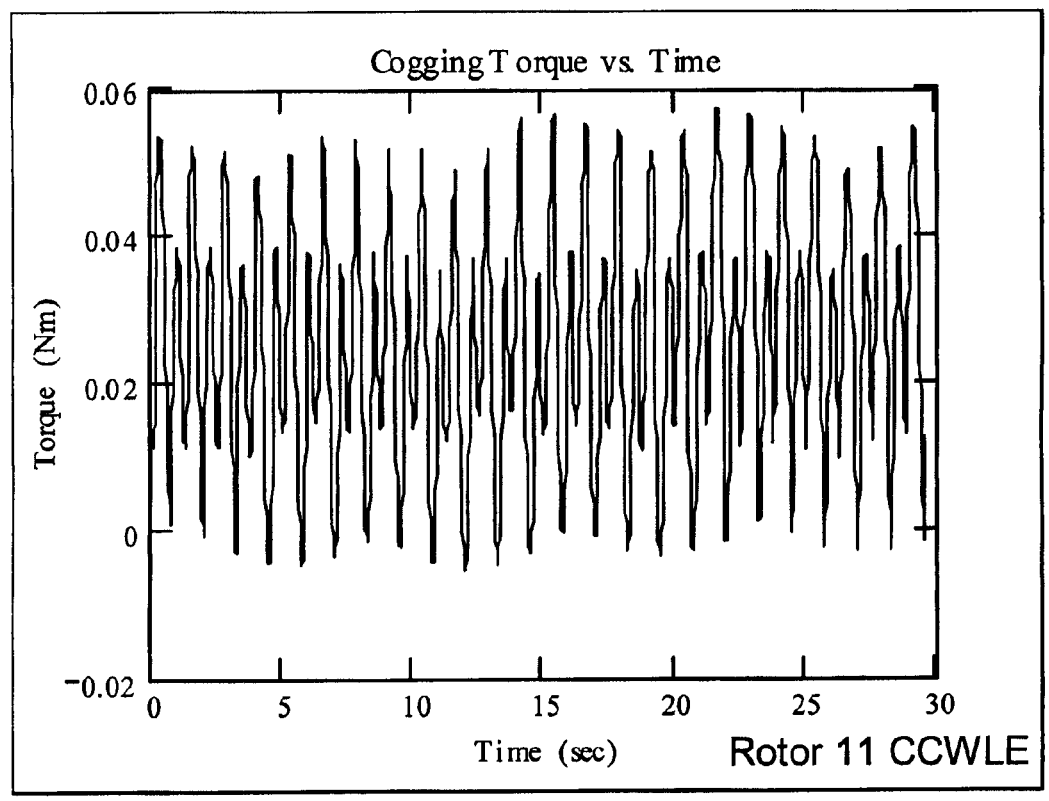
FIG. 11B is a graph illustrating the cogging torque of a motor or generator including a rotor having laminations as illustrated in FIG. 11 including angled slots 202.

FIG. 11 is a cross sectional view taken along a perpendicular to the axis of rotation 10 of a lamination 200 of a rotor according to one embodiment of the invention. This embodiment is the same as FIG. 4 except that slots 202 are tear-shaped having one end which is wider than the other end as compared to the slots 76 of FIG. 4. In addition, the slots 202 have a longitudinal axis 204 which is at a lesser angle relative to a longitudinal axis 206 of its associated interior magnet 208 as compared to the angle of axis 80 of the slots 76 of FIG. 4.

Figure 12:
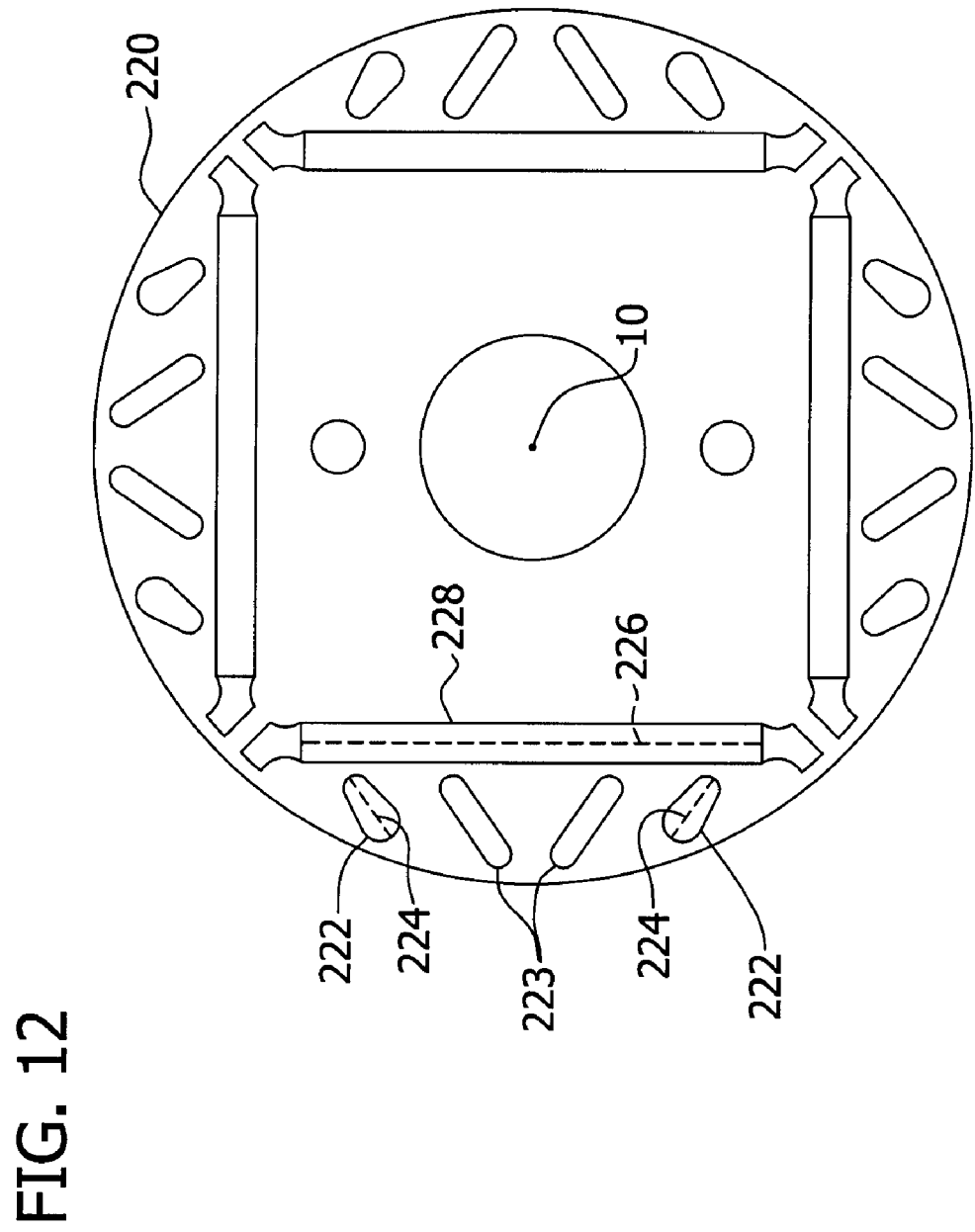
Figure 12A:
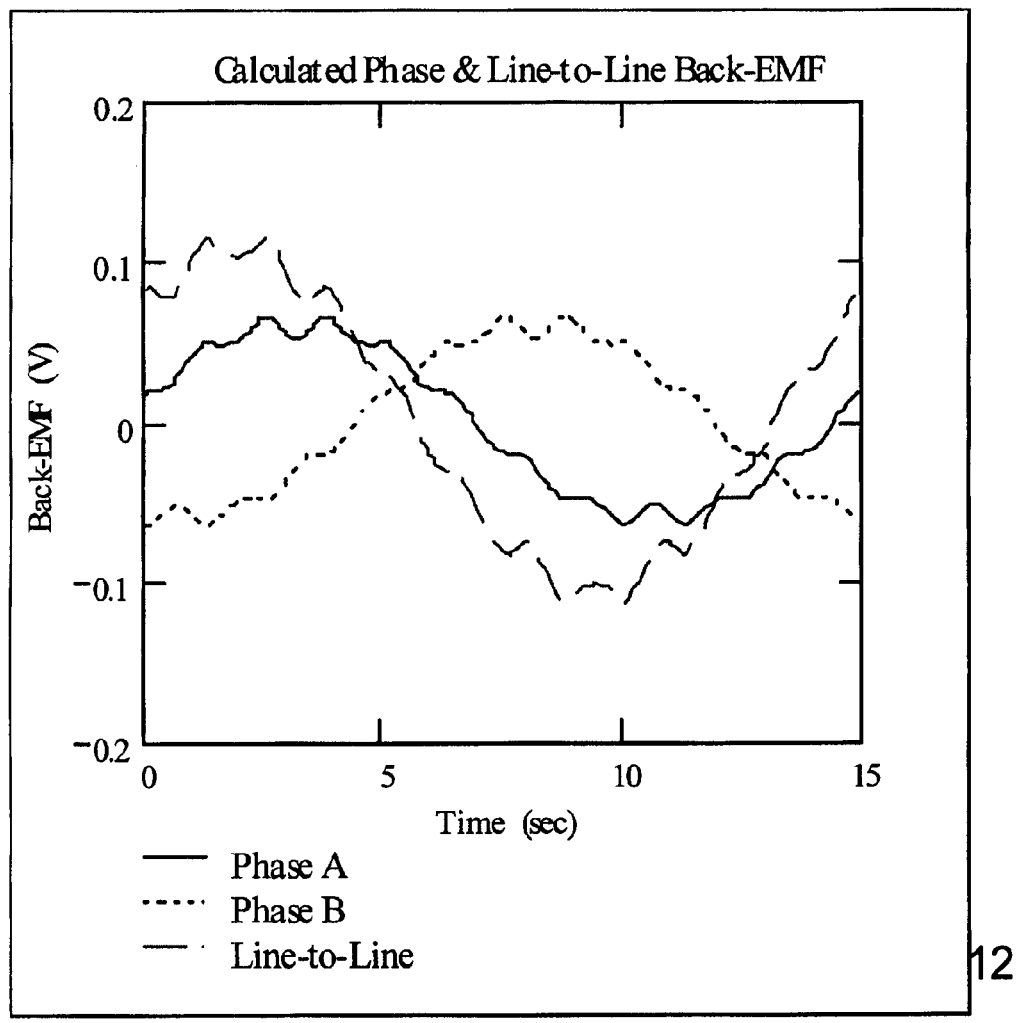

FIG. 12 is a cross sectional view taken along a perpendicular to the axis of rotation 10 of a lamination 220 of a rotor according to one embodiment of the invention. This embodiment is the same as FIG. 11 except that slots 222 have a narrower width as compared to the slots 202 of FIG. 11. In addition, the slots 222 have a longitudinal axis 224 which is at a greater angle relative to a longitudinal axis 226 of its associated interior magnet 228 as compared to the angle of axis 204 of the slots 202 of FIG. 11.

Figure 13:
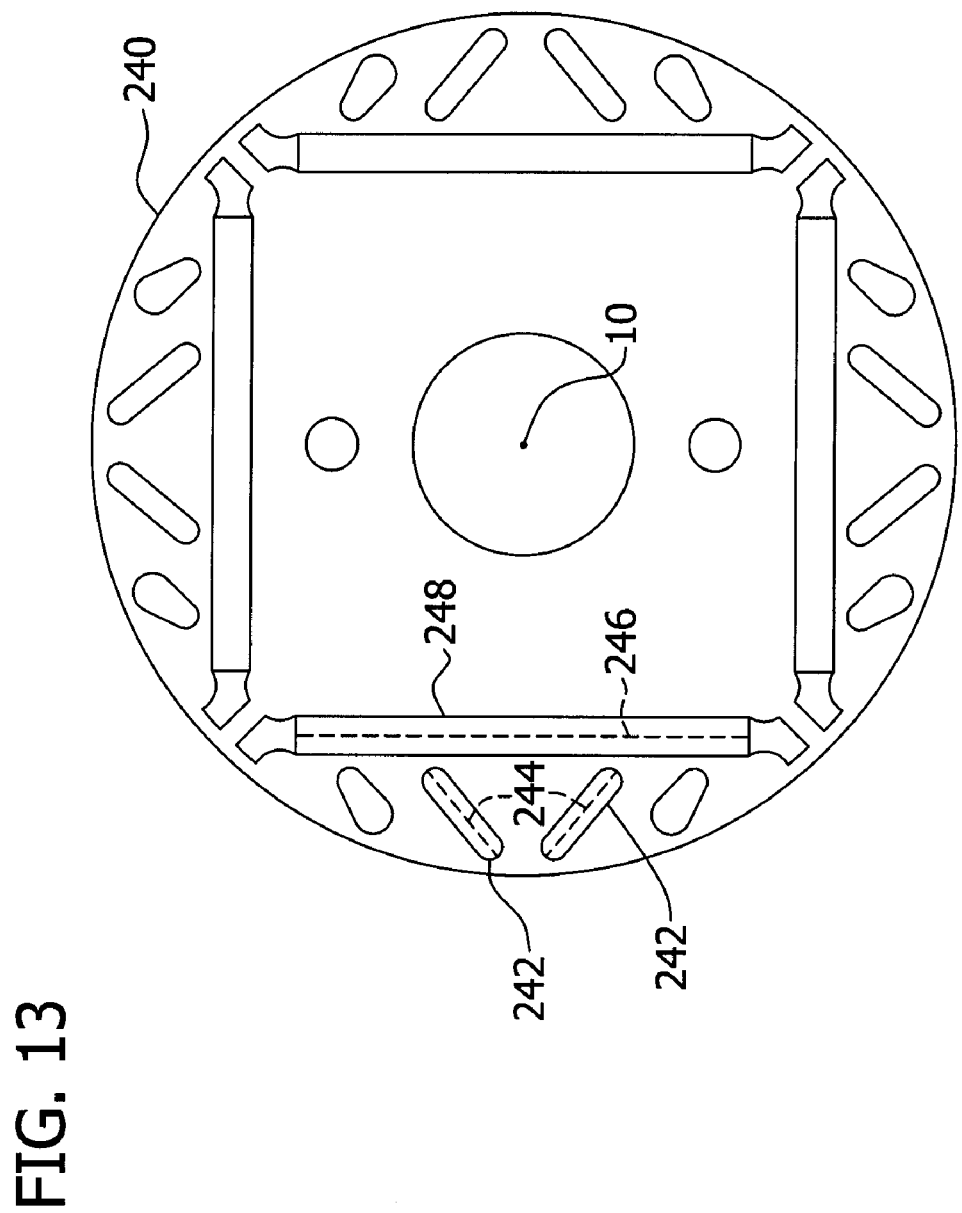
Figure 13A:
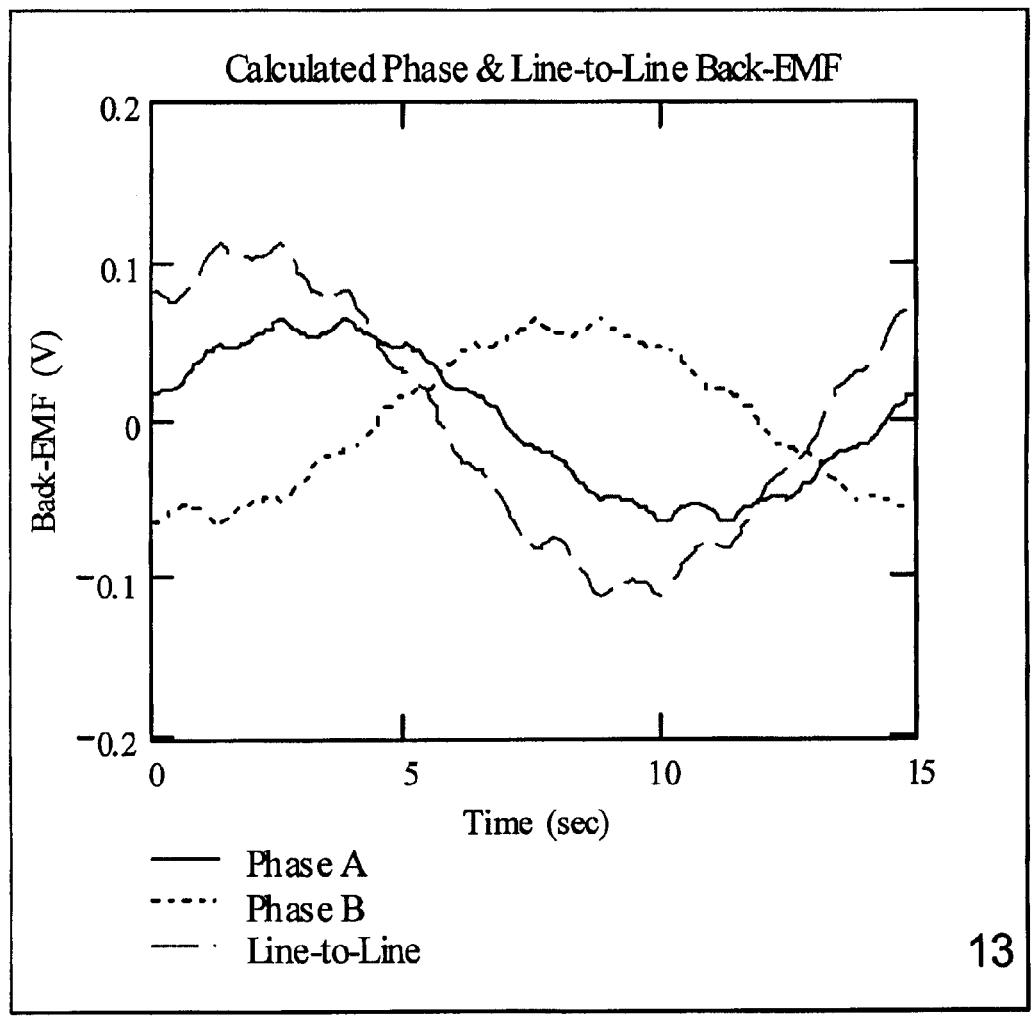

FIG. 13 is a cross sectional view taken along a perpendicular to the axis of rotation 10 of a lamination 240 of a rotor according to one embodiment of the invention. This embodiment is the same as FIG. 12 except that slots 242 have a longitudinal axis 244 which is at a lesser angle relative to a longitudinal axis 246 of its associated interior magnet 248 as compared to the angle of axis 224 of the slots 222 of FIG. 12.

Figure 14:
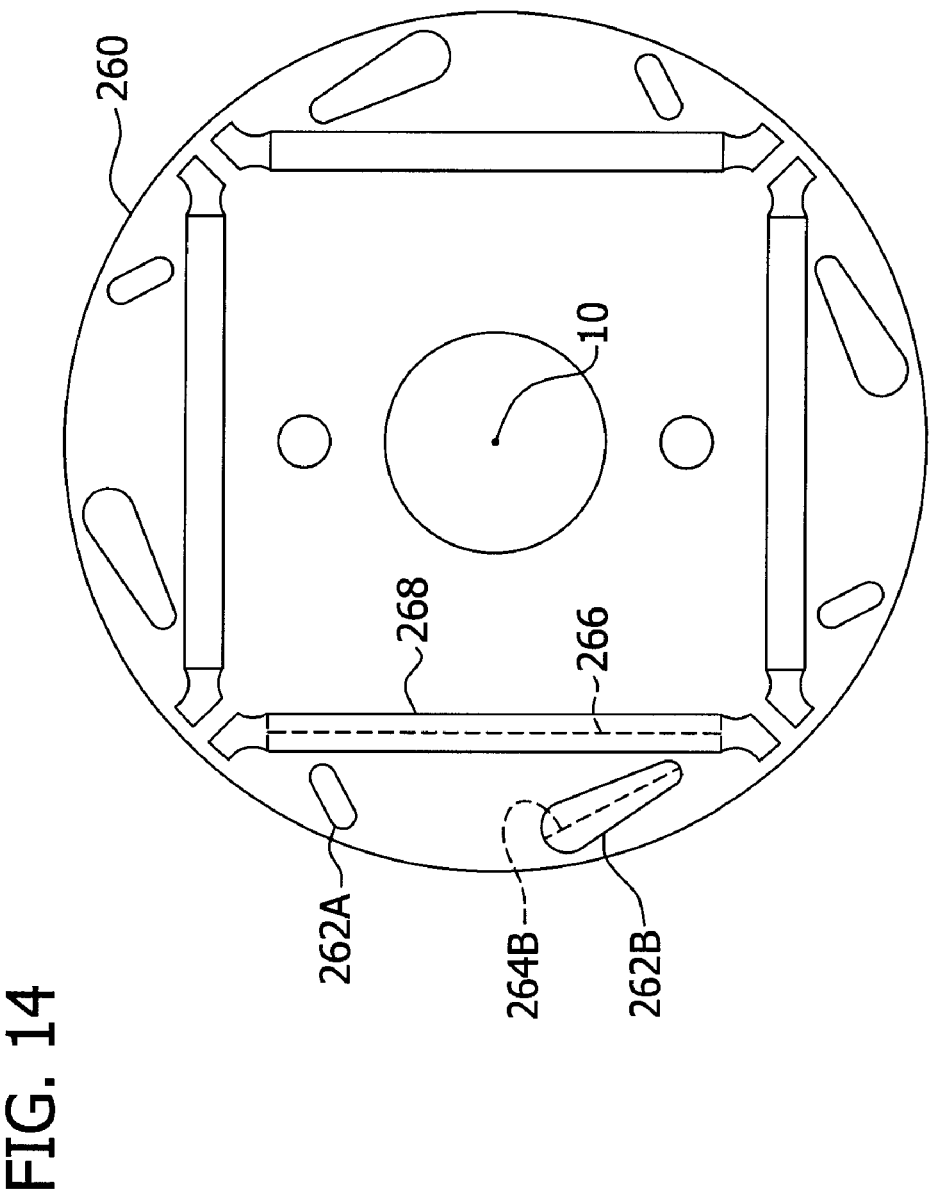
Figure 14A:
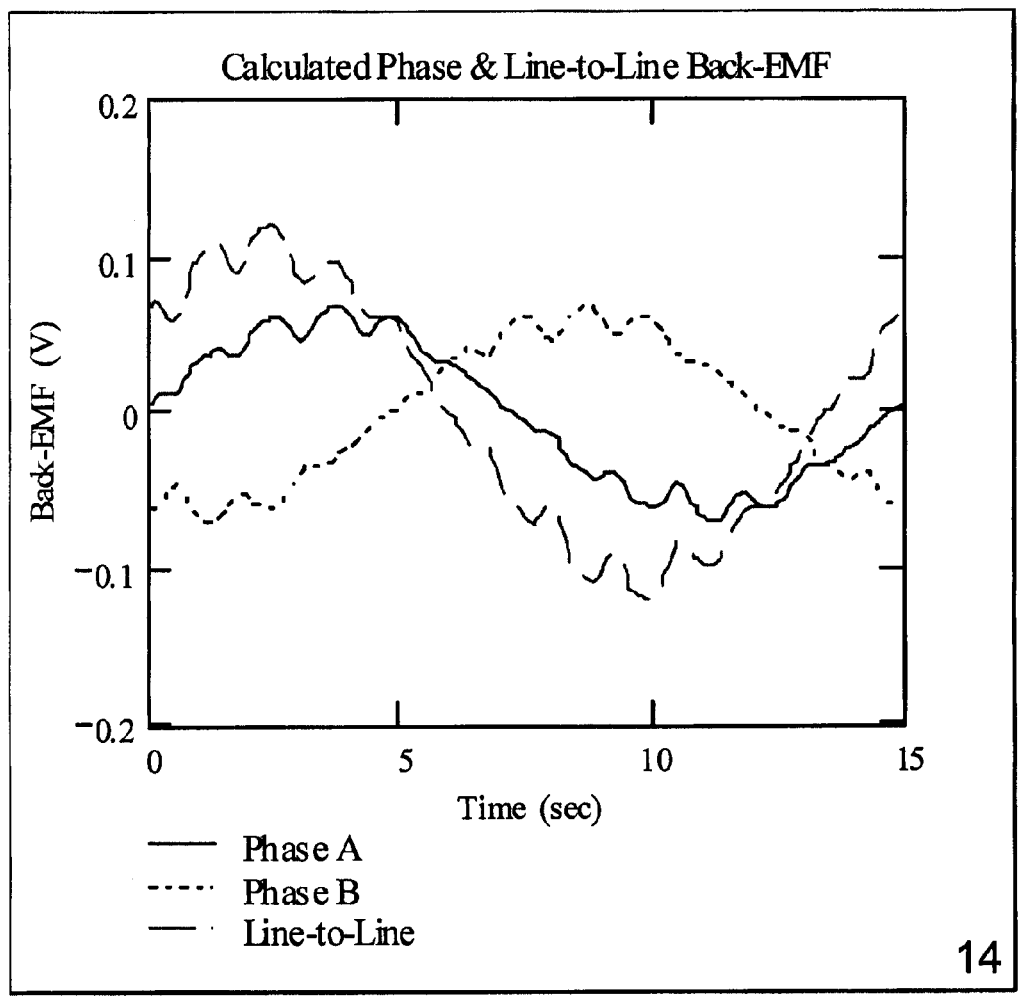

FIG. 14 is a cross sectional view taken along a perpendicular to the axis of rotation 10 of a lamination 260 of a rotor according to one embodiment of the invention. This embodiment is the same as FIG. 1 except that one of two slots 262, namely slot 262B, is longer and tear-shaped as compared to the slots 16 of FIG. 1, both of which are the same shape and position. In addition, the tear-shaped slot 262B has a longer length along axis 264B as compared to the slots 16 of FIG. 1. In addition, slot 262B is at a lesser angle relative to a longitudinal axis 266 of its associated interior magnet 268 as compared to the angle of axis 20 of the slots 16 of FIG. 1.

Figure 15:
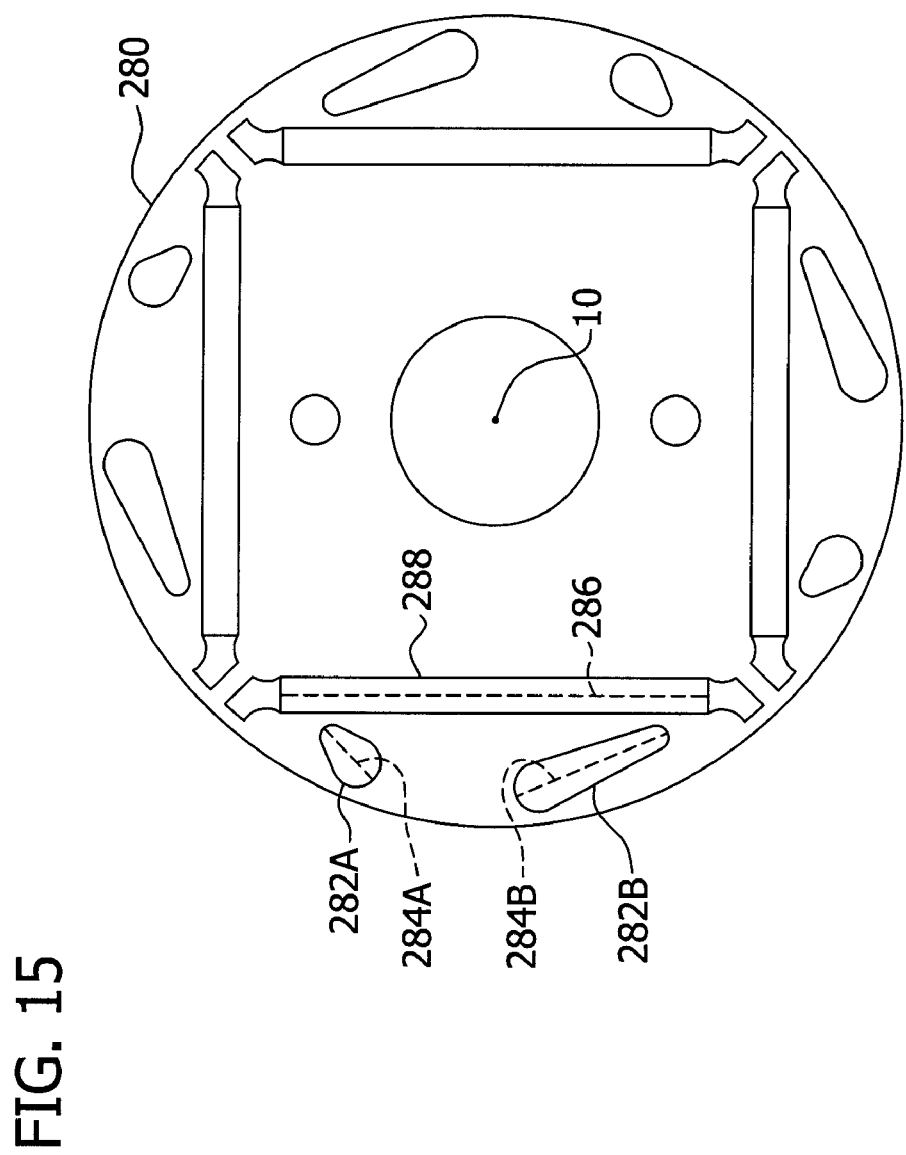
Figure 15A:
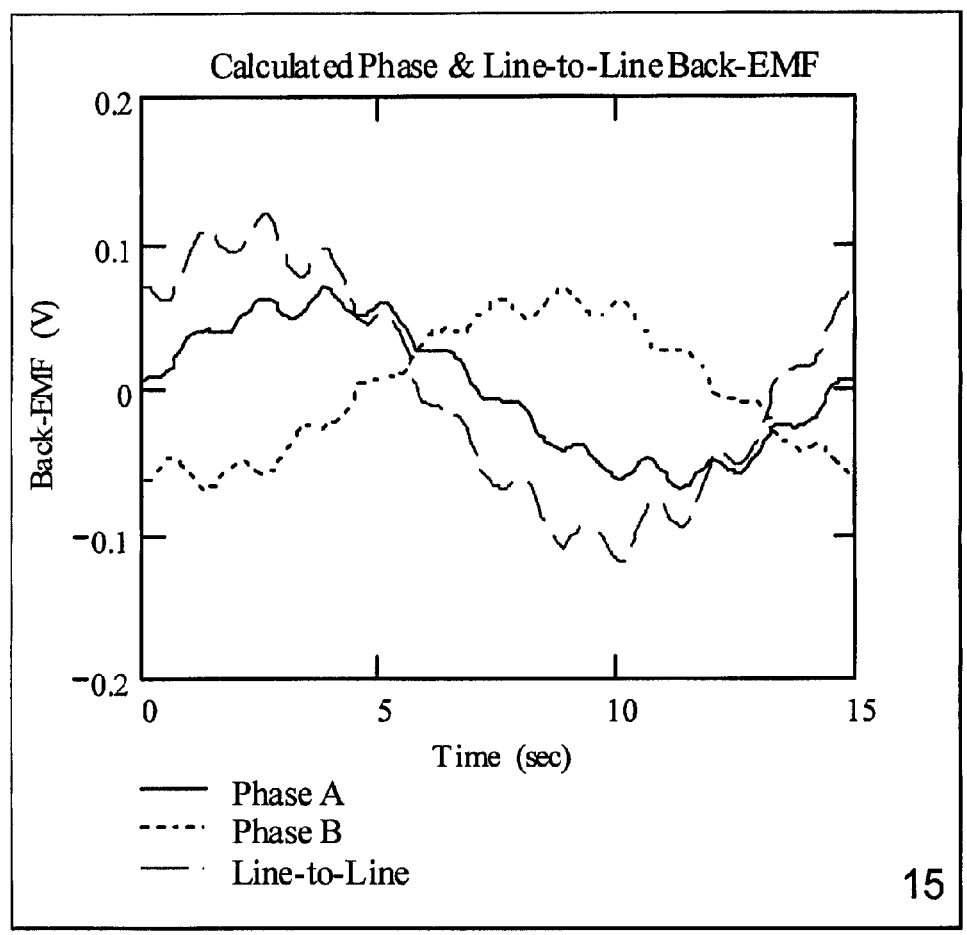

FIG. 15 is a cross sectional view taken along a perpendicular to the axis of rotation 10 of a lamination 280 of a rotor according to one embodiment of the invention. This embodiment is the same as FIG. 1 except that both slots 282 are tear-shaped and slot 282B is longer as compared to the slots 16 of FIG. 1, both of which are the same shape and position. In addition, the tear-shaped slot 282B has a longer length along axis 284B as compared to the slots 16 of FIG. 1. In addition, both tear-shaped slots 282 are at a lesser angle relative to a longitudinal axis 286 of its associated interior magnet 288 as compared to the angle of axis 20 of slots 16 of FIG. 1.

Figure 16:
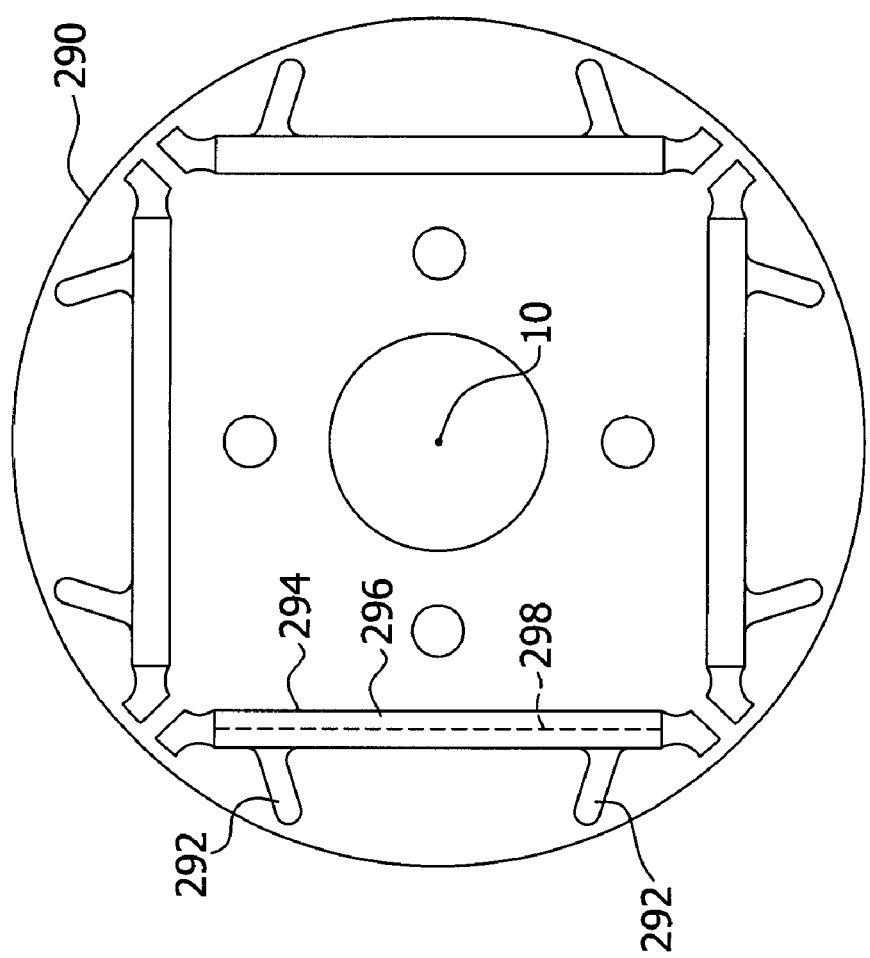

FIG. 16 is a cross sectional view taken along a perpendicular to the axis of rotation 10 of a lamination 290 of a rotor according to one embodiment of the invention. This embodiment is the same as FIG. 1 except that both slots 292 are connected to a slot 294 for an associated interior magnet 296 as compared to FIG. 1 wherein the slots 16 are not connected to the slots for magnets 14. In addition, both slots 292 are at a lesser angle relative to a longitudinal axis 298 of its associated interior magnet 296 as compared to the angle of axis 20 of slots 16 of FIG. 1.

FIG. 17 is a cross sectional view taken along a perpendicular to the axis of rotation 10 of a lamination 300 of a rotor according to one embodiment of the invention. FIG. 17 is similar to FIG. 1 except that it has six interior magnets 302 instead of the four interior magnets 14 of FIG. 1. In addition, FIG. 17 has S-shaped slots 304 instead of the slots 16 of FIG. 1, which are generally shaped rectangular with rounded corners.

Figure 18:
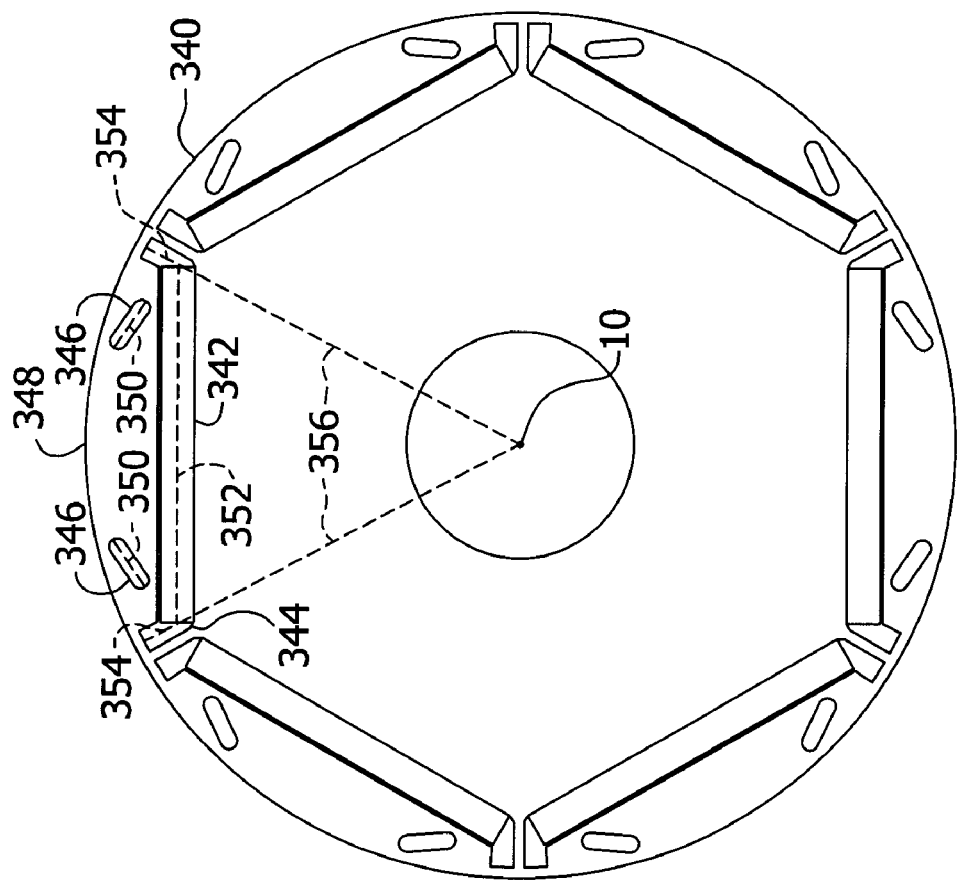

FIG. 18 is a cross sectional view taken along a perpendicular to the axis of rotation 10 of a lamination 340 of a rotor according to one embodiment of the invention. In FIG. 18, six interior magnets 342 equally spaced about the periphery are illustrated. Each magnet has a trapezoidal end slot 344 at each end. Each interior magnet 342 has two associated slots 346 between the magnet 342 and a periphery 348 of the lamination 340 and wherein the longitudinal axis 350 of the slots 346 are at an angle of less than 90 degrees relative to a longitudinal axis 352 of its associated interior magnet 342. In this embodiment, each interior magnet 342 is illustrated as having the optional end slots 344. The slots 346 and/or the end slots 344 may be filled with air or other non-magnetic material. In addition, as illustrated in FIG. 18, the slots 346 are not connected to one of the end slots 344. Further, in this embodiment, the at least part of the end slots 344 have an axis 354 which is coaxial with a radius 356 of the lamination 340.

Figure 19:
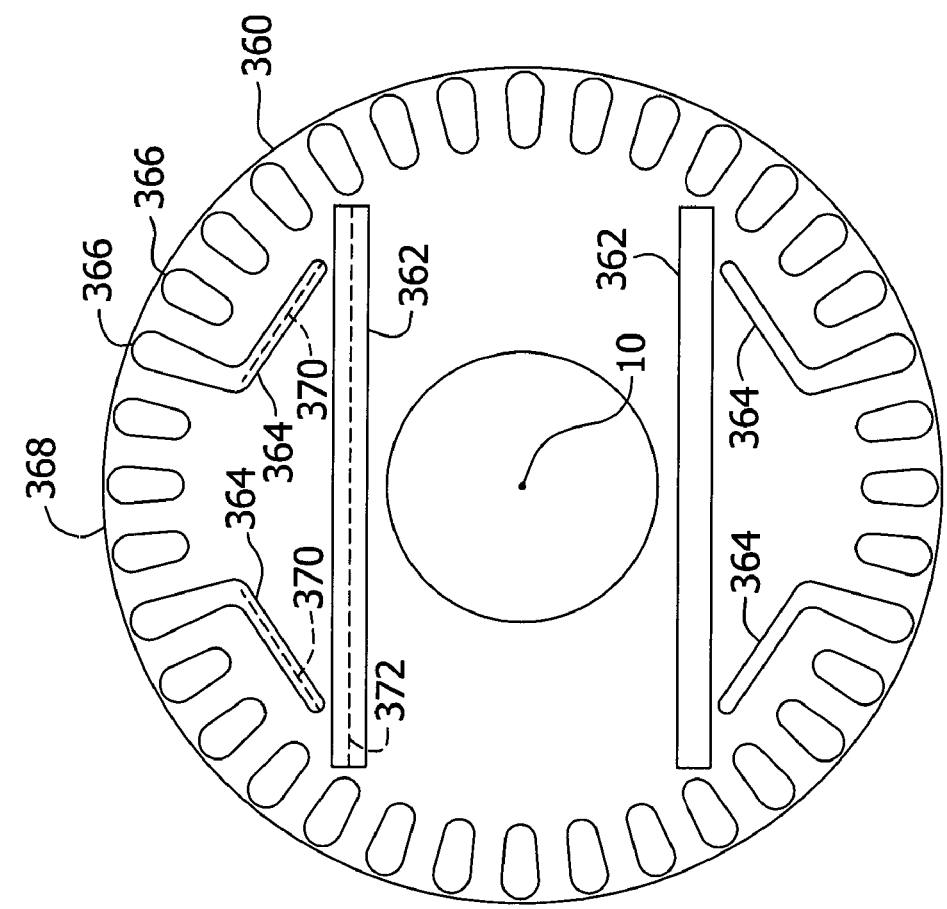
FIGS. 19 and 20 are cross sectional views of embodiments of the invention including two interior magnets, each having two angled slots per magnetic pole.
Figure 19A:
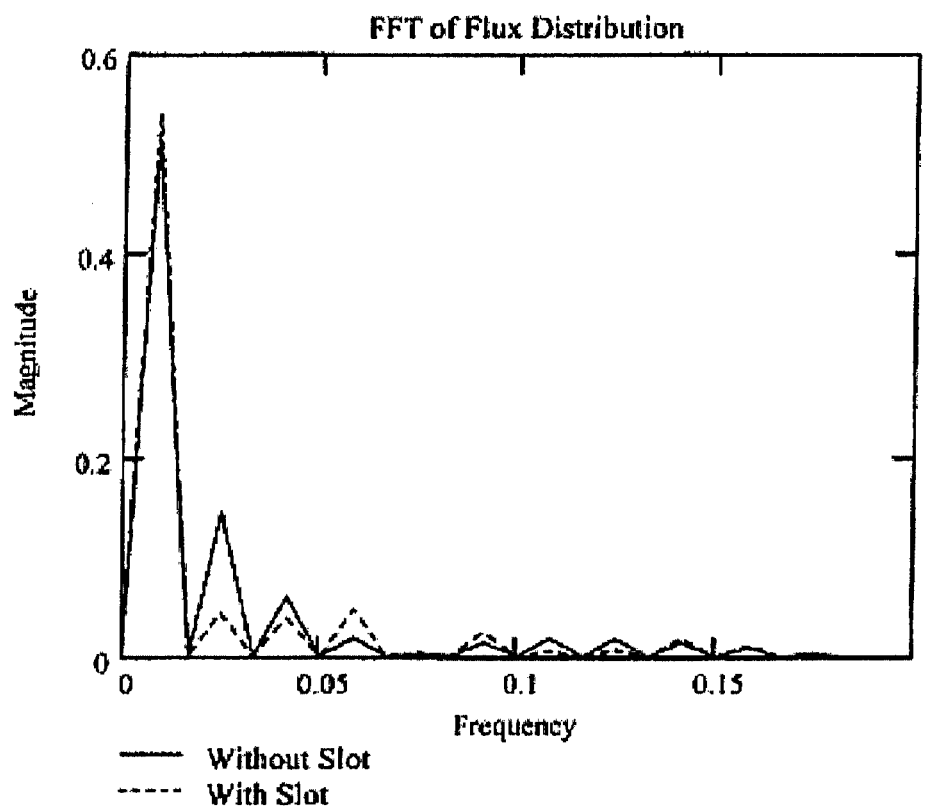
FIG. 19A is a graph illustrating the flux distribution of a motor or generator including a rotor having laminations as illustrated in FIG. 19 including angled slots 364.
Figure 19B:
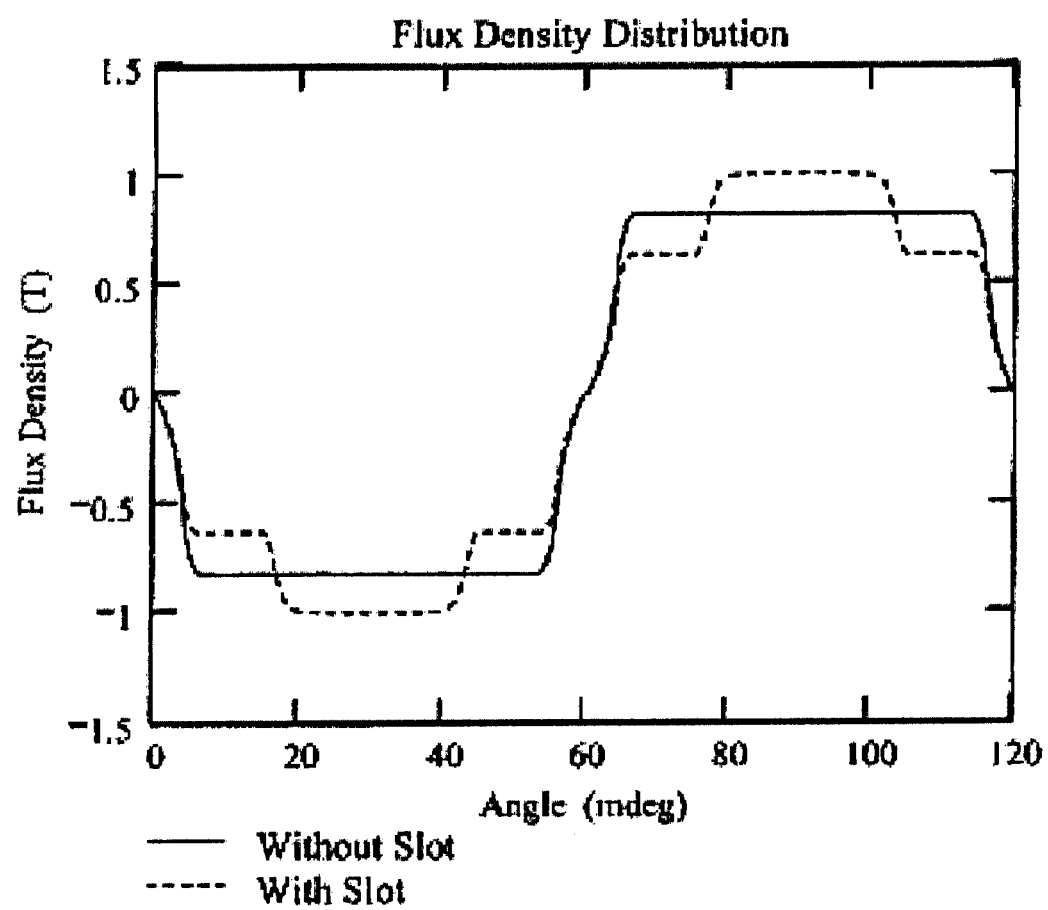
FIG. 19B is a graph illustrating the flux density distribution of a motor or generator including a rotor having laminations as illustrated in FIG. 19 including angled slots 364.

FIG. 19 is a cross sectional view taken along a perpendicular to the axis of rotation 10 of a lamination 360 of a rotor according to one embodiment of the invention. In FIG. 19, two parallel interior magnets 362 equally spaced within the periphery are illustrated. Each interior magnet 362 has two associated slots 364 between the magnet 362 and starting cage slots 366 positioned about the periphery 368 of the lamination 360. The longitudinal axis 370 of the slots 364 are at an angle of less than 90 degrees relative to a longitudinal axis 372 of its associated interior magnet 362. The slots 364 and/or the starting cage slots 366 may be filled with air or other non-magnetic material. In addition, as illustrated in FIG. 19, the slots 364 are connected to and integral with one of the starting cage slots 366.

Figure 20:
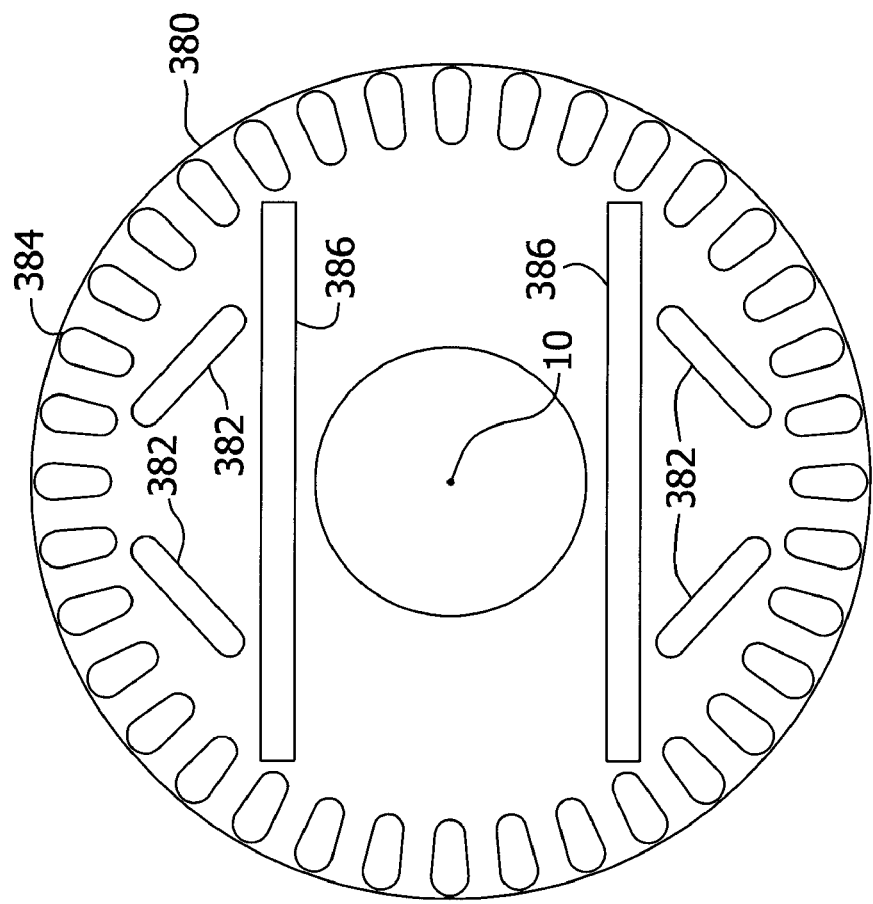

FIG. 20 is a cross sectional view taken along a perpendicular to the axis of rotation 10 of a lamination 380 of a rotor according to one embodiment of the invention. FIG. 20 is the same as FIG. 19 except slots 382 are not connected to any of starting cage slots 384. Instead, in FIG. 20, the slots 382 are independent of the cage slots 384 and are positioned between the cage slots 384 and magnets 386.

Figure 21:
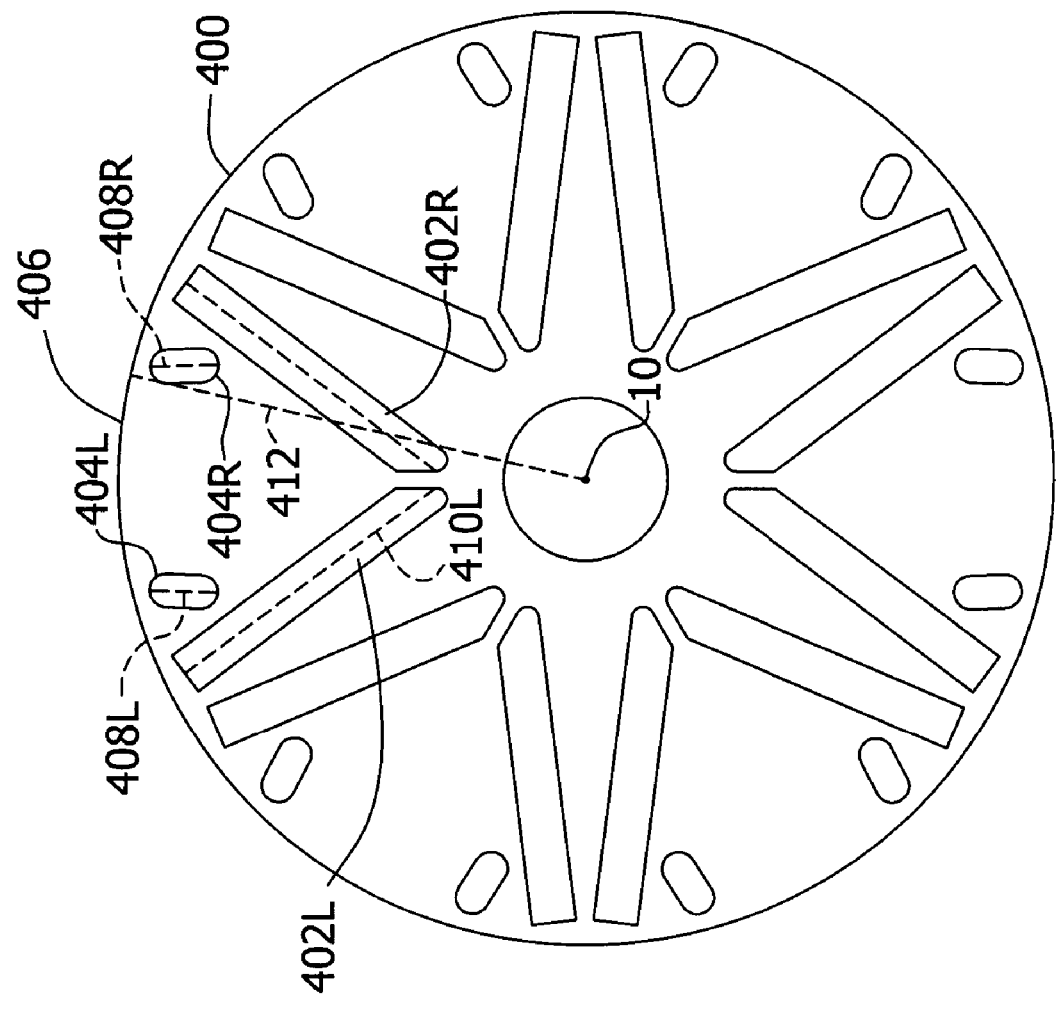
FIG. 21 is a cross sectional view of an embodiment of the invention including twelve interior magnets, arranged to produce six magnetic poles with two angled slots per pole.

FIG. 21 is a cross sectional view taken along a perpendicular to a central axis of rotation 10 of a lamination 400 of a rotor according to one embodiment of the invention. In FIGS. 1-20 above, the interior magnets are positioned parallel to a tangent to the periphery of the rotor lamination. In contrast, in the lamination 400 of FIG. 21 each interior magnet 402R, 402L is part of a V-shaped pair and each is at an angle relative to the tangent to the periphery. Further, each magnet 402R, 402L has at least one associated slot 404R, 404L between the magnet 402R, 402L and a periphery 406 of the lamination. In this embodiment, a longitudinal axis 408R, 408L of the slots 404R, 404L are at an angle of less than 90 degrees relative to a longitudinal axis 410R, 410L of its associated interior magnet 402.

In the embodiment of FIG. 21, the longitudinal axis 408R, 408L of each slot 404R, 404L is not coaxial with a radius 412 of the lamination 400, although it is contemplated that the axis 408R, 408L and radius 412 may be coaxial. Similarly, in FIG. 1-20, the slots are not coaxial with a radius because the interior magnets are positioned parallel to a tangent to the periphery of the rotor lamination and the slots are paired, with each slot of a pair facing the other slot of the pair. Thus, the slots form an angle of less than 90 degrees with the interior magnets. It is contemplated that the slots may face away from each other in which case the slots may be coaxial with a radius of the rotor but the slots would still be at an angle of less than 90 degrees with the interior magnets.

Figure 22:
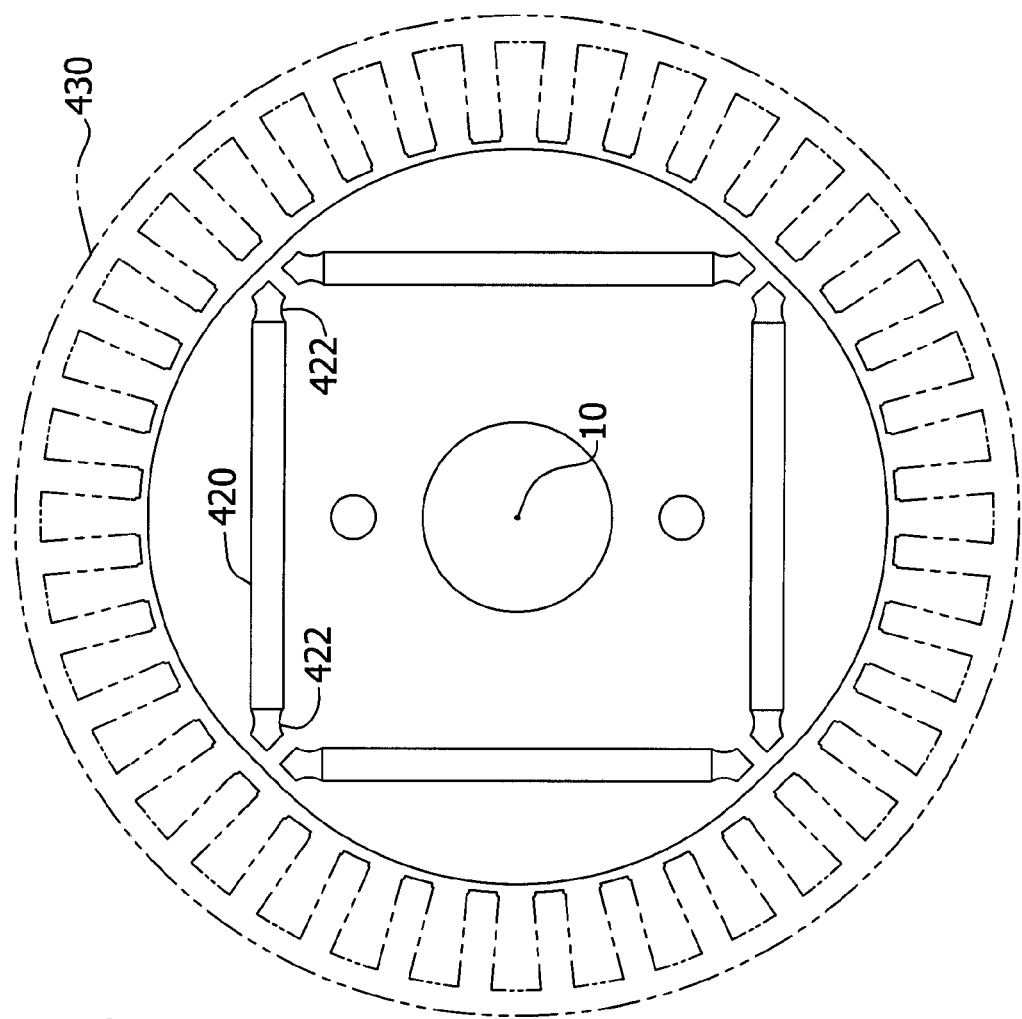
FIG. 22 is a cross sectional view of a crown rotor lamination of the prior art without any angled slots according to the invention. The crowning of the pole surface results in a non-uniform air-gap.
Figure 22A:
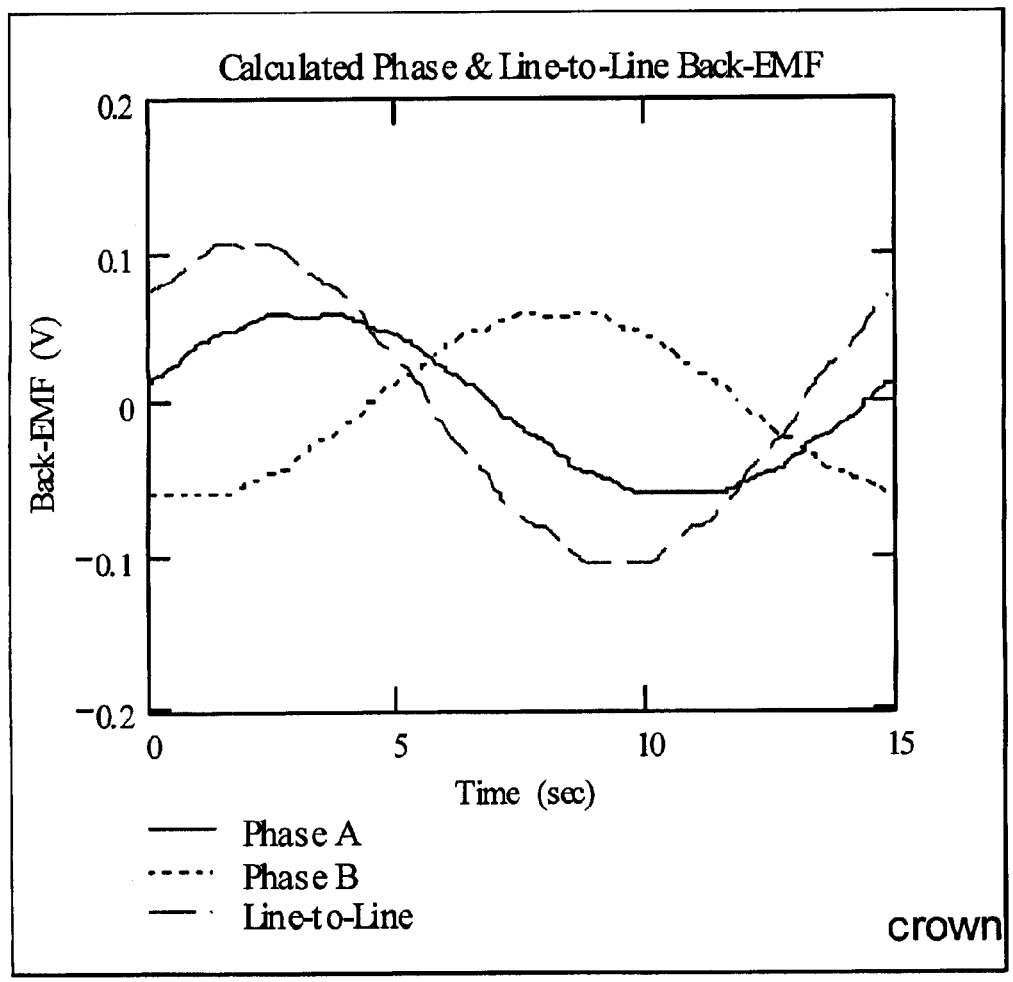
FIG. 22A is a graph illustrating the back emf of a non-uniform air-gap motor or generator including a rotor having laminations as illustrated in FIG. 22 according to the prior art without any angled slots.
Figure 22B:
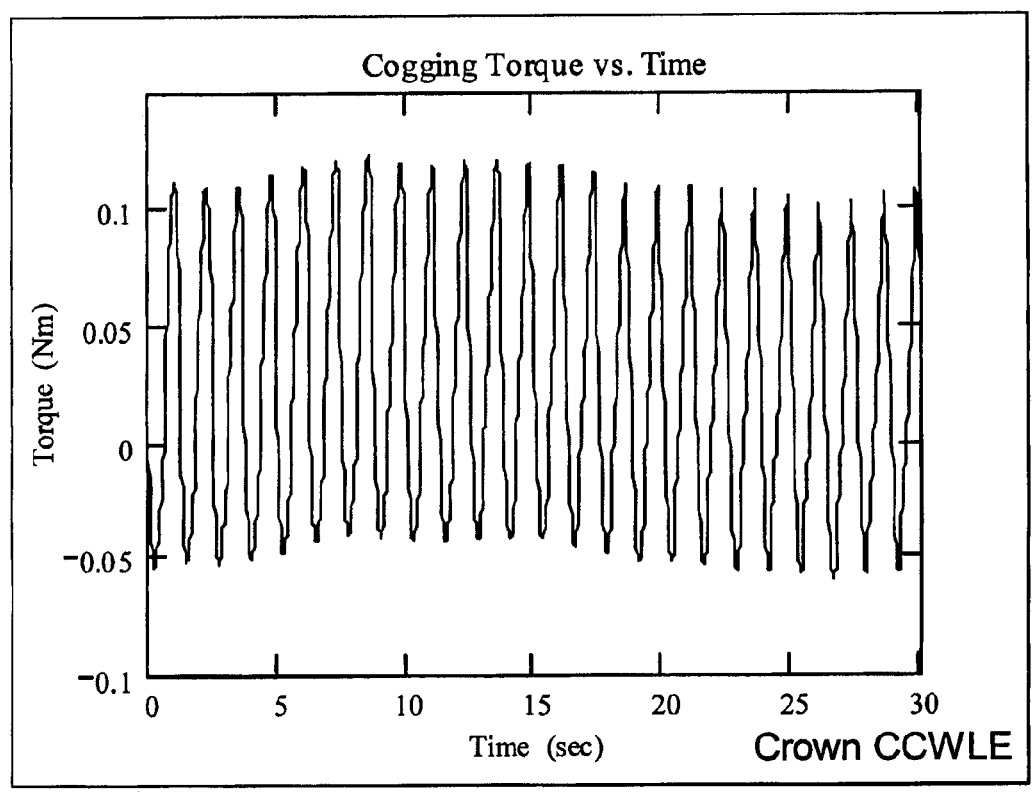
FIG. 22B is a graph illustrating the cogging torque of a non-uniform air-gap motor or generator including a rotor having laminations as illustrated in FIG. 22 according to the prior art without any angled slots.

FIG. 22 is an illustration of a crown rotor according to the prior art without any slots. Each interior magnet 420 has an end slot 422, as shown. The end slots of FIGS. 1-18 have a slightly different shape than the end slots 422. In particular, the end slots of FIGS. 1-18 were positioned to be the same distance from the periphery as the end slots 422 to maintain the same flux leakage. A stator 430 is shown in phantom, the stator being in magnetic coupling arrangement with the crown rotor.

TABLE 1 illustrates finite element modeling results regarding the back emf and cogging for the embodiments of FIGS. 1, 2, 3, 4, 5 and 22 having the slot dimensions indicated. Slot 1 refers to the slots in a two slot configuration and the outer slots in a four slot configuration. Slot 2 refers to the inner slots of a four slot configuration.

TABLE 2 illustrates finite element modeling results regarding the back emf and cogging for the embodiments of FIGS. 6, 7, 8, 9, 10 and 11 having the slot dimensions indicated. Slot 1 refers to the slots in a two slot configuration and the outer slots in a four slot configuration. Slot 2 refers to the inner slots of a four slot configuration.

TABLE 3 illustrates finite element modeling results regarding the back emf and cogging for the embodiments of FIGS. 12, 13, 14 and 15 having the slot dimensions indicated. Slot 1 refers to the slots in a two slot configuration and the outer slots in a four slot configuration. Slot 2 refers to the inner slots of a four slot configuration.

TABLE 4 illustrates test results regarding the back emf and cogging for the embodiments of FIGS. 1, 9, 11 and 22 (CROWN) having the slot dimensions indicated.

TABLE 1

| | | FIGS. 1, 2, 3, 4, 5 AND 22. | | | | | | |
|---|---|---|---|---|---|---|---|---|
| | | Crown FIG. 21 | FIG. 1 W/O SLOTS | FIG. 1 | FIG. 2 | FIG. 3 | FIG. 4 | FIG. 5 |
| | | | Back-EMF | | | | | |
| Fundamental | $V_{pk}$ at 2 rpm | 0.105 | 0.106 | 0.109 | 0.109 | 0.109 | 0.109 | 0.109 |
| 5th Harmonic | % Fund. | 0.04 | 2.52 | 1.62 | 1.68 | 1.8 | 1.62 | 1.66 |
| 7th Harmonic | % Fund. | 0.64 | 1.22 | 1.62 | 1.36 | 1.79 | 1.6 | 1.6 |
| 11th Harmonic | % Fund. | 2.65 | 8.53 | 11.38 | 11.47 | 5.93 | 11.31 | 10.43 |
| 13th Harmonic | % Fund. | 0.09 | 0.59 | 3.66 | 2.76 | 3.35 | 3.57 | 2.82 |

TABLE 1-continued

FIGS. 1, 2, 3, 4, 5 AND 22.

|  |  | Crown FIG. 21 | FIG. 1 W/O SLOTS | FIG. 1 | FIG. 2 | FIG. 3 | FIG. 4 | FIG. 5 |
|---|---|---|---|---|---|---|---|---|
| THD | % | 0.09 | 0.86 | 1.48 | 1.51 | 0.69 | 1.47 | 1.21 |
| Cogging | Nm$_{pk}$ | 0.085 | 0.377 | 0.085 | 0.377 | 0.208 | 0.083 | 0.06 |
| Pole Arc | edeg |  | 158.94 | 158.94 | 158.94 | 158.94 | 158.94 | 158.94 |
| Slot 1 Dimensions ||||||||||
| Inner Tangent Arc | edeg | N/A | N/A | 111.8 | 111.8 | 111.8 | 111.8 | 111.8 |
| Inner Radius | mm | N/A | N/A | 0.75 | 0.75 | 0.75 | 0.75 | 0.75 |
| Outer Tangent Arc | edeg | N/A | N/A | 87.76 | 97.36 | 78.16 | 87.76 | 87.76 |
| Outer Radius | mm | N/A | N/A | 0.75 | 0.75 | 0.75 | 0.75 | 0.75 |
| Slot 2 Dimensions ||||||||||
| Inner Tangent Arc | edeg | N/A | N/A | N/A | N/A | N/A | 40.88 | 53.4 |
| Inner Radius | mm | N/A | N/A | N/A | N/A | N/A | 0.75 | 0.75 |
| Outer Tangent Arc | edeg | N/A | N/A | N/A | N/A | N/A | 23.36 | 23.36 |
| Outer Radius | mm | N/A | N/A | N/A | N/A | N/A | 0.75 | 0.75 |

TABLE 2

FIGS. 6, 7, 8, 9, 10 AND 11.

|  |  | FIG. 6 | FIG. 7 | FIG. 8 | FIG. 9 | FIG. 10 | FIG. 11 |
|---|---|---|---|---|---|---|---|
| Back-EMF |||||||||
| Fundamental | V$_{pk}$ at 2 rpm | 0.108 | 0.108 | 0.108 | 0.109 | 0.107 | 0.105 |
| 5th Harmonic | % Fund. | 2.24 | 1.79 | 1.68 | 1.62 | 1.73 | 1.91 |
| 7th Harmonic | % Fund. | 1.56 | 1.26 | 1.63 | 1.68 | 2.08 | 1.61 |
| 11th Harmonic | % Fund. | 1.84 | 9.63 | 9.24 | 9.77 | 8.64 | 6.16 |
| 13th Harmonic | % Fund. | 5.93 | 0.33 | 1.43 | 1.57 | 2.83 | 0.43 |
| THD | % | 0.5 | 1.01 | 0.94 | 1.05 | 0.9 | 0.48 |
| Cogging | Nm$_{pk}$ | 0.354 | 0.386 | 0.086 | 0.024 | 0.13 | 0.096 |
| Pole Arc | edeg | 158.94 | 158.94 | 158.94 | 158.94 | 162 | 158.94 |
| Slot 1 Dimensions |||||||||
| Inner Tangent Arc | edeg |  | 111.8 | 111.8 | 111.8 | 111.8 | 111.8 |
| Inner Radius | mm |  | 0.75 | 0.75 | 0.75 | 0.75 | 0.75 |
| Outer Tangent Arc | edeg |  | 100.06 | 87.76 | 87.76 | 87.76 | 87.76 |
| Outer Radius | mm |  | 0.75 | 0.75 | 1.5 | 0.75 | 1.5 |
| Slot 2 Dimensions |||||||||
| Inner Tangent Arc | edeg |  | 53.4 | 53.4 | N/A | N/A | 53.4 |
| Inner Radius | mm |  | 0.75 | 0.75 | N/A | N/A | 0.75 |
| Outer Tangent Arc | edeg |  | 23.36 | 18.36 | N/A | N/A | 18.36 |
| Outer Radius | mm |  | 0.75 | 0.75 | N/A | N/A | 0.75 |

TABLE 3

FIGS. 12, 13, 14 AND 15.

|  |  | FIG. 12 | FIG. 13 | FIG. 14 | FIG. 15 |
|---|---|---|---|---|---|
| Back-EMF ||||||
| Fundamental | V$_{pk}$ at 2 rpm | 0.107 | 0.105 | 0.107 | 0.104 |
| 5th Harmonic | % Fund. | 1.73 | 1.82 | 2.71 | 2.75 |
| 7th Harmonic | % Fund. | 1.62 | 1.6 | 0.95 | 0.63 |
| 11th Harmonic | % Fund. | 8.16 | 7.12 | 8.48 | 12.59 |
| 13th Harmonic | % Fund. | 1.03 | 0.709 | 5.74 | 1.98 |
| THD | % | 0.74 | 0.59 | 1.21 | 1.73 |
| Cogging | Nm$_{pk}$ | 0.068 | 0.082 | 0.295 | 0.232 |
| Pole Arc | edeg | 158.94 | 158.94 | 158.4 | 158.4 |
| Slot 1 Dimensions ||||||
| Inner Tangent Arc | edeg | 111.8 | 111.8 | 111.8 | 111.8 |
| Inner Radius | mm | 0.75 | 0.75 | 0.75 | 0.75 |
| Outer Tangent Arc | edeg | 87.76 | 87.76 | 87.76 | 87.76 |
| Outer Radius | mm | 1.125 | 1.125 | 0.75 | 1.5 |
| Slot 2 Dimensions ||||||
| Inner Tangent Arc | edeg | 53.4 | 59.92 | 114.48 | 111.8 |
| Inner Radius | mm | 0.75 | 0.75 | 0.75 | 0.75 |
| Outer Tangent Arc | edeg | 18.36 | 18.36 | 40.28 | 26.04 |
| Outer Radius | mm | 0.75 | 0.75 | 1.5 | 1.5 |

TABLE 4

| | | Crown FIG. 22 | FIG. 1 W/O SLOTS | FIG. 1 | FIG. 9 | FIG. 11 |
|---|---|---|---|---|---|---|
| Back-EMF | | | | | | |
| Maximum | $V_{pk}$ at 1000 rpm | 51.1 | 57.3 | 62.6 | 58.1 | 53.1 |
| Fundamental | $V_{pk}$ at 1000 rpm | 50.9 | 53.5 | 54.8 | 53.4 | 50.5 |
| 5th Harmonic | % Fund. | 0.75 | 1.84 | 0.93 | 1.01 | 1.19 |
| 7th Harmonic | % Fund. | 0.42 | 0.76 | 1.18 | 1.23 | 1.1 |
| 11th Harmonic | % Fund. | 2.22 | 7.93 | 11.34 | 9.18 | 5.28 |
| 13th Harmonic | % Fund. | 0.14 | 1.2 | 3.58 | 1.28 | 1.09 |
| THD | % | 0.059 | 0.729 | 1.46 | 0.903 | 0.341 |
| Cogging | $Nm_{pk}$ | 0.086 | 0.281 | 0.037 | 0.034 | 0.031 |

FIGS. 1, 9, 11 AND 22

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A rotor comprising:
    a cylindrical periphery having a central axis of rotation;
    a cross-section taken perpendicular to the central axis of rotation, said cross section of the rotor comprising:
        a plurality of interior permanent magnets, each interior permanent magnet having two poles and having a longitudinal dimension which is greater than a transverse dimension;
        a plurality of non-magnetic peripheral slots, at least two non-magnetic peripheral slots associated with each pole of the interior permanent magnets, each non-magnetic peripheral slot positioned between the cylindrical periphery and its associated interior permanent magnet and each non-magnetic peripheral slot is not contiguous with its associated interior permanent magnet, each non-magnetic peripheral slot having a longitudinal dimension which is greater than a transverse dimension, wherein an axis of the longitudinal dimension of each non-magnetic peripheral slot is not perpendicular to an axis of the longitudinal dimension of its associated interior permanent magnet, wherein the axis of the longitudinal dimension of each non-magnetic peripheral slot is not coaxial with a line within the cross-section intersecting the central axis of rotation, and wherein the non-magnetic peripheral slots associated with each interior permanent magnet pole have different lengths; and
        a plurality of non-magnetic end slots, each non-magnetic end slot contiguous to and integral with each end of each pole of each interior permanent magnet wherein at least part of each non-magnetic end slot has a central axis which is coaxial with a radius of the rotor.

2. The rotor of claim 1 wherein at least one of the non-magnetic slots has at least one of the following shapes: a tear-shape and an S-shape.

3. The rotor of claim 1 further comprising non-magnetic starting cage slots forming an interior starting cage of the rotor.

4. The rotor of claim 3 wherein the non-magnetic slots are positioned between the non-magnetic staffing cage slots and the magnets.

5. A machine comprising:
    a stator; and
    a rotor in magnetic coupling engagement with the stator, said rotor comprising a cylindrical periphery having a central axis of rotation;
    a cross-section taken perpendicular to the central axis of rotation, said cross section of the rotor comprising:
        a plurality of buried interior permanent magnets, each magnet having two poles and having a longitudinal dimension which is greater than a transverse dimension;
        a plurality of non-magnetic peripheral slots, at least two non-magnetic peripheral slots associated with each pole of the magnets and positioned between the cylindrical periphery and the magnet with which the non-magnetic peripheral slot is associated, each non-magnetic slot having a longitudinal dimension which is greater than a transverse dimension, wherein the non-magnetic peripheral slots associated with each interior permanent magnet pole have different lengths, wherein each non-magnetic peripheral slot is not contiguous with its associated interior permanent magnet; and wherein an axis of the longitudinal dimension of each non-magnetic peripheral slot is not perpendicular to an axis of the longitudinal dimension of its associated interior magnet, and wherein the axis of the longitudinal dimension of the non-magnetic slot is not coaxial with a line within the cross-section intersecting the central axis of rotation; and
        a plurality of non-magnetic end slots contiguous to and integral with each end of each magnet wherein at least part of each non-magnetic end slot has an axis which is coaxial with a radius of the rotor.

6. The machine of claim 5 wherein at least one of the non-magnetic peripheral slots has at least one of the following shapes: a tear-shape and an S-shape.

7. The machine of claim 5 further comprising non-magnetic staffing cage slots forming an interior starting cage of the machine.

8. A rotor comprising:
- a plurality of laminations, each having a cylindrical periphery having a central axis of rotation;
- a cross-section taken perpendicular to the central axis of rotation, said cross section of each lamination comprising:
  - a plurality of interior permanent magnet slots, each interior permanent magnet slot having a longitudinal dimension which is greater than a transverse dimension;
  - a plurality of non-magnetic peripheral slots, each non-magnetic peripheral slot associated with one of the interior permanent magnet slots and positioned between the cylindrical periphery and the interior permanent magnet slots with which the non-magnetic peripheral slot is associated, wherein each non-magnetic peripheral slot is not contiguous with its associated interior permanent magnet, each non-magnetic peripheral slot having a longitudinal dimension which is greater than a transverse dimension wherein an axis of the longitudinal dimension of each non-magnetic peripheral slot is not perpendicular to an axis of the longitudinal dimension of its associated interior permanent magnet; and
  - a plurality of non-magnetic end slots contiguous to and integral with each end of each interior permanent magnet slot wherein at least part of each non-magnetic end slot has an axis which is coaxial with a radius of the rotor.

9. The rotor of claim 8 wherein an axis of the longitudinal dimension of the non-magnetic peripheral slot is not coaxial with a line within the cross-section intersecting the central axis of rotation.

10. The rotor of claim 9 wherein the non-magnetic peripheral slots associated with each interior permanent magnet pole have different lengths.

11. The rotor of claim 10 wherein at least one of the non-magnetic slots has at least one of the following shapes: a tear-shape and an S-shape.

12. The rotor of claim 11 wherein each interior permanent magnet slot has a permanent magnet having two poles and wherein at least two of said non-magnetic peripheral slots are associated with each said pole.

13. The rotor of claim 12 further comprising non-magnetic starting cage slots forming an interior staffing cage of the rotor.

14. The rotor of claim 13 wherein the non-magnetic slots are positioned between the non-magnetic starting cage slots and the magnets.

15. The rotor of claim 8 wherein the non-magnetic peripheral slots associated with each interior permanent magnet pole have different lengths.

16. The rotor of claim 8 wherein at least one of the non-magnetic slots has at least one of the following shapes: a tear-shape and an S-shape.

17. The rotor of claim 8 wherein each interior permanent magnet slot has a permanent magnet having two poles and wherein at least two of said non-magnetic peripheral slots are associated with each said pole.

18. The rotor of claim 8 further comprising non-magnetic starting cage slots forming an interior staffing cage of the rotor.

19. The rotor of claim 18 wherein the non-magnetic slots are positioned between the non-magnetic starting cage slots and the magnets.

20. The rotor of claim 7 wherein the non-magnetic slots are positioned between the non-magnetic starting cage slots and the magnets.

* * * * *